United States Patent
Eriguchi

(10) Patent No.: US 9,129,657 B2
(45) Date of Patent: Sep. 8, 2015

(54) VIDEO IMAGE DISPLAY APPARATUS, VIDEO IMAGE DISPLAY METHOD, NON-TRANSITORY COMPUTER READABLE MEDIUM, AND VIDEO IMAGE PROCESSING/DISPLAY SYSTEM FOR VIDEO IMAGES OF AN OBJECT SHOT FROM MULTIPLE ANGLES

(71) Applicant: Teppei Eriguchi, Saitama (JP)

(72) Inventor: Teppei Eriguchi, Saitama (JP)

(*) Notice: Subject to any disclaimer, the term of this patent is extended or adjusted under 35 U.S.C. 154(b) by 0 days.

(21) Appl. No.: 14/344,245

(22) PCT Filed: Sep. 27, 2012

(86) PCT No.: PCT/JP2012/074896
§ 371 (c)(1),
(2) Date: Mar. 11, 2014

(87) PCT Pub. No.: WO2013/047663
PCT Pub. Date: Apr. 4, 2013

(65) Prior Publication Data
US 2015/0010287 A1  Jan. 8, 2015

(30) Foreign Application Priority Data

Sep. 29, 2011 (JP) ................................ 2011-214000
Mar. 29, 2012 (JP) ................................ 2012-075900

(51) Int. Cl.
*H04N 5/77* (2006.01)
*G11B 27/30* (2006.01)
(Continued)

(52) U.S. Cl.
CPC ............ *G11B 27/3081* (2013.01); *G11B 27/02* (2013.01); *G11B 31/006* (2013.01);
(Continued)

(58) Field of Classification Search
CPC .............. H04N 9/8227; H04N 5/2627; H04N 21/21805; H04N 5/2628; H04N 5/247; H04N 5/262
USPC .......................... 386/341, 230, 343, 223, 278
See application file for complete search history.

(56) References Cited

U.S. PATENT DOCUMENTS 4,868,682 A * 9/1989 Shimizu et al. ................ 386/324
6,430,361 B2 * 8/2002 Lee ................................ 386/203
(Continued)

FOREIGN PATENT DOCUMENTS

DE     4114440 A  * 11/1992
EP     0845903 A2   6/1998
(Continued)

OTHER PUBLICATIONS

PCT/ISA/210, "International Search Report for PCT/JP2012/074896".
(Continued)

*Primary Examiner* — David Harvey
(74) *Attorney, Agent, or Firm* — Manabu Kanesaka

(57) ABSTRACT

A video image display apparatus includes a processor, a memory, and a display unit wherein the memory contains instructions for causing the processor to perform operations of reading out, among from time/angle video image data, frames corresponded to time identification information and angle identification information in a frame-by-frame manner in a time order of the time identification information. The operations include causing the display unit to display the frames in the frame-by-frame manner in the time order of the time identification information; and inputting an angle switching instruction for the video image. Upon successive input of the angle switching instruction, the video image display apparatus successively reads out a frame corresponded to the time identification information at a time of input and the angle identification information, and the display unit successively switches to and displays the frame.

13 Claims, 34 Drawing Sheets

(51) Int. Cl.

| | | |
|---|---|---|
| *H04N 9/82* | (2006.01) | |
| *H04N 21/218* | (2011.01) | |
| *H04N 21/236* | (2011.01) | |
| *H04N 21/2365* | (2011.01) | |
| *G11B 27/02* | (2006.01) | |
| *G11B 31/00* | (2006.01) | |
| *H04N 5/262* | (2006.01) | |
| *H04N 5/765* | (2006.01) | |

(52) U.S. Cl.
 CPC ............ *H04N5/2628* (2013.01); *H04N 5/772* (2013.01); *H04N 9/8227* (2013.01); *H04N 21/21805* (2013.01); *H04N 21/2365* (2013.01); *H04N 21/23602* (2013.01); *H04N 5/765* (2013.01)

(56) References Cited

U.S. PATENT DOCUMENTS

| | | | |
|---|---|---|---|
| 8,045,845 B2 * | 10/2011 | Braun et al. ............... 386/353 |
| 8,698,875 B2 * | 4/2014 | Anguelov et al. ............ 348/36 |
| 8,837,921 B2 * | 9/2014 | Braun et al. ............... 386/357 |
| 2002/0145660 A1 * | 10/2002 | Kanade et al. ............ 348/36 |
| 2002/0190991 A1 * | 12/2002 | Efran et al. ............... 345/475 |
| 2003/0086003 A1 | 5/2003 | Koga |
| 2003/0210329 A1 * | 11/2003 | Aagaard et al. ............ 348/159 |
| 2005/0206783 A1 | 9/2005 | Kato |
| 2005/0254363 A1 | 11/2005 | Hamada et al. |
| 2009/0290848 A1 * | 11/2009 | Brown ............... 386/52 |
| 2012/0188452 A1 * | 7/2012 | Keiser et al. ............ 348/559 |

FOREIGN PATENT DOCUMENTS

| | | | |
|---|---|---|---|
| JP | H09-186957 A | | 7/1997 |
| JP | H10-243383 A | | 9/1998 |
| JP | 2000-050210 A | | 2/2000 |
| JP | 2000-293937 A | | 10/2000 |
| JP | 2000-298516 A | | 10/2000 |
| JP | 2003-018583 A | | 1/2003 |
| JP | 2003-037838 A | | 2/2003 |
| JP | 2003-101957 | * | 4/2003 |
| JP | 2003-179800 A | | 6/2003 |
| JP | 2003-324689 A | | 11/2003 |
| JP | 2004-328450 A | | 11/2004 |
| JP | 2005-050710 A | | 2/2005 |
| JP | 2005-051710 A | | 2/2005 |
| JP | 2006-050491 A | | 2/2006 |
| WO | 2004/045206 A1 | | 5/2004 |
| WO | 2004-045206 A1 | | 5/2004 |

OTHER PUBLICATIONS

Japan Patent Office, "Office Action for JP 2011-214000," Jan. 10, 2012.

Europe Patent Office, "Search Report for EP 12835916.3," Feb. 23, 2015.

* cited by examiner

ANGLE OF VIEW MATCHED
REFERRING TO SPHERE.

TILT MATCHED REFERRING TO
INCLINATION OF VERTICAL SHAFT.

CENTER OF SCREEN MATCHED
REFERRING TO CENTER POINT.

TIME OF OBJECT IMAGES SHOT BY MULTIPLE CAMERAS MATCHED REFERRING TO FLASH OF SPHERE.

FIG.14

| TC1 | | |
|---|---|---|
| AC1 | AC2 | AC3 |
| AC4 | AC5 | AC6 |
| AC7 | AC8 | AC9 |

FIG.24

MOTION BLUR LEVEL

SHIFT INFORMATION (LARGE → SMALL) vs TIME INFORMATION (SMALL → LARGE)

| SHIFT \ TIME | 0.1 | (0.2) | 0.4 | 0.6 | 0.8 | 1 | 1.2 | 1.4 | 1.6 | 1.8 | 2 |
|---|---|---|---|---|---|---|---|---|---|---|---|
| 200 | 21 | 20 | 19 | 18 | 17 | 16 | 15 | 14 | 13 | 12 | 11 |
| 180 | 20 | 19 | 18 | 17 | 16 | 15 | 14 | 13 | 12 | 11 | 10 |
| 160 | 19 | 18 | 17 | 16 | 15 | 14 | 13 | 12 | 11 | 10 | 9 |
| 140 | 18 | 17 | 16 | 15 | 14 | 13 | 12 | 11 | 10 | 9 | 8 |
| 120 | 17 | 16 | 15 | 14 | 13 | 12 | 11 | 10 | 9 | 8 | 7 |
| 100 | 16 | 15 | 14 | 13 | 12 | 11 | 10 | 9 | 8 | 7 | 6 |
| 80 | 15 | 14 | 13 | 12 | 11 | 10 | 9 | 8 | 7 | 6 | 5 |
| 60 | 14 | 13 | 12 | 11 | 10 | 9 | 8 | 7 | 6 | 5 | 4 |
| 40 | 13 | 12 | 11 | 10 | 9 | 8 | 7 | 6 | 5 | 4 | 3 |
| (20) | 12 | (11) | 10 | 9 | 8 | 7 | 6 | 5 | 4 | 3 | 2 |
| 1 | 11 | 10 | 9 | 8 | 7 | 6 | 5 | 4 | 3 | 2 | 1 |

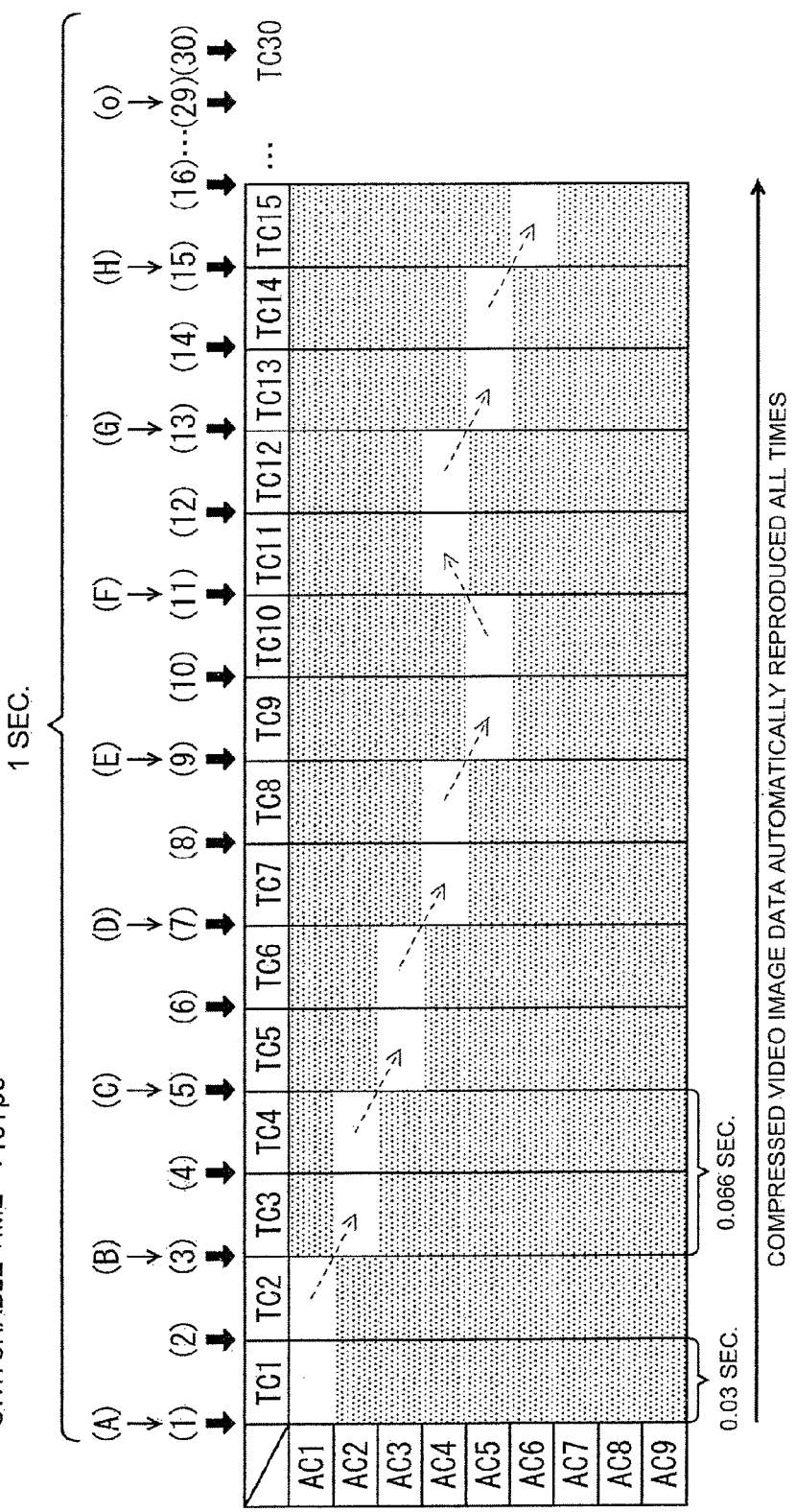

VIDEO IMAGE DISPLAY APPARATUS, VIDEO IMAGE DISPLAY METHOD, NON-TRANSITORY COMPUTER READABLE MEDIUM, AND VIDEO IMAGE PROCESSING/DISPLAY SYSTEM FOR VIDEO IMAGES OF AN OBJECT SHOT FROM MULTIPLE ANGLES

RELATED APPLICATIONS

The present application is National Phase of International Application No. PCT/JP2012/074896 filed Sep. 27, 2012, and claims priority from Japanese Applications No. 2011-214000, filed Sep. 29, 2011 and No. 2012-075900, filed Mar. 29, 2012.

TECHNICAL FIELD

One or more embodiments of the present invention relate to a video image display device which displays video image, a video image display method, a non-transitory computer readable medium, and a video image processing/display system which processes and displays video image.

BACKGROUND ART

There have been used display devices which display video images of the same object shot from multiple angles by a plurality of cameras, alternatively in an angle-by-angle manner (see Patent Document 1, for example).

Among these display devices, there has been known a first display device as illustrated in FIG. 29, configured to switch the angles on and after TS (time stamp) which contains a plurality of frames, or on and after a specific unit called key frame, according to a video compression scheme such as MPEG-2.

Having also known a second display device as illustrated in FIG. 30, configured to display only a desired frame on the screen, while concurrently and respectively reproducing all video images at a plurality of angles in an synchronized manner, and to alternatively switch the frame to be displayed among other frames which are concurrently reproduced, upon receiving an angle switching instruction issued by the user.

CITATION LIST

Patent Literature

Patent Literature 1: JP-A-2005-051710

SUMMARY OF THE INVENTION

Technical Problem

The first display device allows angle switching TS-by-TS or key frame-by-key frame, but does not allow angle switching by the minimum unit of frame. This produces a time lag between issuance of an instruction for angle switching by the user and an actual point of time when the display switches, so that the user would feel difficult to naturally switch the angles in a manner well matched to the user's sense. While it is theoretically possible to configure the TS or the key frame by the minimum frame unit, this will unnecessarily expand the data size, and will make the compression per se nonsense.

Meanwhile, the second display device allows angle switching by the minimum frame unit, since video images shot from a plurality of angles are displayed while concurrently reproducing a plurality of independent video image data in a synchronized manner. However, by the nature of issuing the angle switching instruction while keeping on issuing the reproduction instruction concurrently for the plurality of independent video image data, the machine will suffer from an increasing load, with increase in the volume of the independent video image data to be reproduced concurrently. This unfortunately causes a time lag behind issuance of the angle switching instruction by the user, if the processing speed of the machine is slow.

Solution to Problem

One or more embodiments of the present invention may provide the solutions below.

According to one or more embodiments of the present invention, there is provided a video image display apparatus which displays video images of an object shot from multiple angles by a plurality of cameras. The video image display apparatus may include a processor, a memory, and a display unit wherein the memory contains instructions for causing the processor to perform operations of: reading out, among from time/angle video image data in which time identification information which indicates a position on a time axis of the video image, and angle identification information which indicates a position for each angle are correlated frame by frame, frames corresponded to the time identification information and the angle identification information in a frame-by-frame manner in a time order of the time identification information; and causing the display unit to display the frames read out, in the frame-by-frame manner in the time order of the time identification information. The operations may include, in a state where an instruction coordinate system for directing angle switching of the video image is correlated with the angle identification information, and in a state where the display unit displays a frame corresponded to a predetermined time identification information and angle identification information, upon continuous shift of coordinates of an angle switching instruction for the video image across the angle identification information adjacent to the angle identification information in the instruction coordinate system, successively inputting the angle switching instruction by successively detecting the shift. The operations may include, upon successive input of the angle switching instruction, successively reading out a frame corresponded to the time identification information at a time of input of the angle switching instruction which is input at the coordinates corresponded to the adjacent angle identification information, and to the adjacent angle identification information, and a frame corresponded to the time identification information at the time of input of the angle switching instruction which is input across the adjacent angle identification information and to the angle identification information beyond the adjacent angle identification information. The operations may include causing the display unit to display the frames read out, as successively switched from the frame being displayed.

One or more embodiments of the present invention may reproduce and display only the frame of a single correspondent time/angle video image data, and to allow angle switching display frame-by-frame, based on the time code and the angle code, without independently reproducing the frames of other time/angle video image data, and thereby video images at angles in which the user wishes to view may be switched in a real time manner, while suppressing the load on the machine.

In addition, the angle of the video image may successively be switched corresponding to the shift of coordinates of the angle switching instruction, simply by continuously shifting the coordinates of the angle switching instruction.

In one or more embodiments of the present invention, the angle switching instruction is implemented by shift in a certain coordinate system, and the coordinate system which determines the shift is understood as the instruction coordinate system.

In one or more embodiments of the present invention, the instruction coordinate system is an instruction spatial coordinate system set in a vicinity of the display unit. The operations may further include detecting continuous shift of the coordinates of a viewer who views the video image in the instruction spatial coordinate system, successively reading out the frames which correspond to the angle identification information corresponded to the coordinates of the viewer at a time when the shift is detected, and to the time identification information at a time when the shift is done, and causing the display unit to display the frames read out while successively switching the frames.

According to these embodiments of the present invention, simply upon continuous shift of the viewer in the instruction spatial coordinate system, the angle of video image may successively be switched depending on the shift of the viewer.

In one or more embodiments of the present invention, the angle identification information is correlated to the instruction spatial coordinate system, so that the angle with respect to the display unit in the instruction spatial coordinate system matches the angle of the video image to be displayed.

According to these embodiments of the present invention, corresponding to shift of the viewer in the instruction spatial coordinate system, the video images may be displayed while being successively switched among them having natural angles and well matched to every coordinates.

In one or more embodiments of the present invention, the instruction coordinate system is an instruction display coordinate system on a display screen of the display unit. The operations may further include successively inputting the angle switching instruction by continuously shifting the coordinates of the angle switching instruction on the display screen, successively reading out the frames which correspond to the angle identification information corresponded to the coordinates of the angle switching instruction at a time of shifting, and to the time identification information at the time of shifting, and causing the display unit to display the frames read out while successively switching the frames.

According to these embodiments of the present invention, simply upon continuous shift of the coordinates of the angle switching instruction, the angle of video images may successively be switched corresponding to the shift of coordinates of the angle switching instruction.

According to one or more embodiments of the present invention, the angle identification information is correlated to the instruction display coordinate system, so that the angle on the display screen in the instruction display coordinate system matches the angle of the video image to be displayed.

According to these embodiments of the present invention, the angle may naturally be switched with better matching to the shift of the user's point of view.

In one or more embodiments of the present invention, the operations may further include blurring the frame depending on a size of shift of the angle switching instruction and a length of time of shifting, reading out the blurred frame, and causing the display unit to display the blurred frame read out.

According to these embodiments of the present invention, presence given by angle shifting may be enhanced.

In one or more embodiments of the present invention, the time/angle video image data is formed independently frame by frame, based on the time identification information and the angle identification information. The operations may further include reading out the frames independently frame by frame, and causing the display unit to reproduce and to display the frames read out, independently frame by frame.

According to these embodiments of the present invention, the display with switched angles frame-by-frame may be implemented in a reliable manner.

In one or more embodiments of the present invention, the time/angle video image data is formed as an angle-synthesized frame obtained by synthesizing the individual frames correlated with the same time identification information, and with different angle identification information. The operations may further include reading out the angle-synthesized frame independently for each of the angle-synthesized frames, and causing the display unit to reproduce the angle-synthesized frames read out, independently for each of the angle-synthesized frames, and to display, among from the reproduced angle-synthesized frames, only the frame corresponded to the angle identification information when the angle switching instruction is input.

According to these embodiments of the present invention, the display with switched angles may be implemented in a more swift manner.

According to one or more embodiments of the present invention, there is provided a video image display method which displays video images of an object shot from multiple angles by a plurality of cameras. The method includes reading out, in which a read-out unit reads, among from time/angle video image data in which time identification information which indicates a position on a time axis of the video image, and angle identification information which indicates a position for each angle are correlated frame by frame, frames corresponded to the time identification information and the angle identification information in a frame-by-frame manner in a time order of the time identification information; displaying, in which a display unit displays the frames read out, in the frame-by-frame manner in the time order of the time identification information; inputting an angle switching instruction, in which, in a state where an instruction coordinate system for directing angle switching of the video image is correlated with the angle identification information, while a frame corresponded to a predetermined time identification information and angle identification information is displayed, and, upon continuous shift of coordinates of an angle switching instruction across the angle identification information adjacent to the angle identification information in the instruction coordinate system, an instruction input unit, which is configured to input the angle switching instruction for video image by detecting shift of coordinates of the angle switching instruction in the instruction coordinate system, successively inputs the angle switching instruction by successively detecting the shift; reading out for switching, in which, upon successive input of the angle switching instruction, the read-out unit successively reads out a frame corresponded to the time identification information at a time of input of the angle switching instruction which is input at the coordinates corresponded to the adjacent angle identification information, and to the adjacent angle identification information, and a frame corresponded to the time identification information at the time of input of the angle switching instruction which is input across the adjacent angle identification information and to the angle identification information beyond the adjacent angle identification information; and displaying, in which the display unit displays the frames read out, as successively switched from the frame being displayed.

One or more embodiments of the present invention may reproduce and display only the frame of a single correspondent time/angle video image data, and to allow the angle switching display frame-by-frame, based on the time code and the angle code, without independently reproducing the frames of other time/angle video image data, and thereby video images at angles in which the user wishes to view may be switched in a real time manner, while suppressing the load on the machine.

In addition, the angle of the video image may successively be switched corresponding to the shift of coordinates of the angle switching instruction, simply by continuously shifting the coordinates of the angle switching instruction.

According to one or more embodiments of the present invention, there is provided a non-transitory computer readable medium for a video image display apparatus which displays video images of an object shot from multiple angles by a plurality of cameras. The non-transitory computer readable medium is configured to make a computer of the video image display apparatus execute: reading out, in which a read-out unit reads, among from time/angle video image data in which time identification information which indicates a position on a time axis of the video image, and angle identification information which indicates a position for each angle are correlated frame by frame, frames corresponded to the time identification information and the angle identification information in a frame-by-frame manner in a time order of the time identification information; displaying, in which a display unit displays the frames read out, in the frame-by-frame manner in the time order of the time identification information; inputting an angle switching instruction, in which, in a state where an instruction coordinate system for directing angle switching of the video image is correlated with the angle identification information, while a frame corresponded to a predetermined time identification information and angle identification information is displayed, and, upon continuous shift of coordinates of the angle switching instruction across the angle identification information adjacent to the angle identification information in the instruction coordinate system, an instruction input unit, which is configured to input the angle switching instruction for the video image by detecting shift of coordinates of the angle switching instruction in the instruction coordinate system, successively inputs the angle switching instruction by successively detecting the shift; reading out for switching, in which, upon successive input of the angle switching instruction, the read-out unit successively reads out a frame corresponded to the time identification information at a time of input of the angle switching instruction which is input at the coordinates corresponded to the adjacent angle identification information, and to the adjacent angle identification information, and a frame corresponded to the time identification information at the time of input of the angle switching instruction which is input across the adjacent angle identification information and to the angle identification information beyond the adjacent angle identification information; and displaying, in which the display unit displays the frames read out, as successively switched from the frame being displayed.

One or more embodiments of the present invention may reproduce and display only the frame of a single correspondent time/angle video image data, and to allow angle switching display frame-by-frame, based on the time code and the angle code, without independently reproducing the frames of other time/angle video image data, and thereby video images at angles in which the user wishes to view may be switched in a real time manner, while suppressing the load on the machine.

In addition, the angle of the video image may successively be switched corresponding to the shift of coordinates of the angle switching instruction, simply by continuously shifting the coordinates of the angle switching instruction.

According to one or more embodiments of the present invention, there is provided a video image processing/display system in which includes a video image processing apparatus, which processes video images of an object shot from multiple angles by a plurality of cameras, and a video image display apparatus which displays the video image processed by the video image processing apparatus, connected to the video image processing apparatus. The video image processing apparatus includes a processor and a memory wherein the memory contains instructions for causing the processor to perform operations of: generating time/angle video image data, by correlating frame-by-frame the video image input from the plurality of cameras with time identification information which indicates a position on a time axis of the video image, and with angle identification information which indicates a position for each angle; and outputting the time/angle video image data generated to the video image display apparatus. In one or more embodiments of the present invention, the video image display apparatus includes a processor, a memory, and a display unit wherein the memory contains instructions for causing the processor to perform operations of: reading out, among from time/angle video image data output from the video image processing apparatus, frames corresponded to the time identification information and the angle identification information in a frame-by-frame manner in a time order of the time identification information; causing the display unit to display the frames read out, in the frame-by-frame manner in the time order of the time identification information. The operations may include, in a state where an instruction coordinate system for directing angle switching of the video image is correlated with the angle identification information, and in a state where the display unit displays a frame corresponded to a predetermined time identification information and angle identification information, upon continuous shift of coordinates of an angle switching instruction for the video image across the angle identification information adjacent to the angle identification information in the instruction coordinate system, successively inputting the angle switching instruction by successively detecting the shift. The operations may include, upon successive input of the angle switching instruction, successively reading out a frame corresponded to the time identification information at a time of input of the angle switching instruction which is input at the coordinates corresponded to the adjacent angle identification information and to the adjacent angle identification information, and a frame corresponded to the time identification information at the time of input of the angle switching instruction which is input across the adjacent angle identification information and to the angle identification information beyond the adjacent angle identification information. The operations may include causing the display unit to display the frames read out, as successively switched from the frame being displayed.

One or more embodiments of the present invention may reproduce and display only the frame of a single correspondent time/angle video image data, and to allow angle switching display frame-by-frame, based on the time code and the angle code, without independently reproducing the frames of other time/angle video image data, and thereby video images at angles in which the user wishes to view may be switched in a real time manner, while suppressing the load on the machine.

In addition, the angle of the video image may successively be switched corresponding to the shift of coordinates of the angle switching instruction, simply by continuously shifting the coordinates of the angle switching instruction.

Advantageous Effects of Invention

According to one or more embodiments of the present invention, not only the video images at angles in which the user wishes to view may be switched in a real time manner, while suppressing the load on the machine, but also the angle of the video image may successively be switched corresponding to the shift of coordinates of the angle switching instruction, simply by continuously shifting the coordinates of the angle switching instruction.

BRIEF DESCRIPTION OF DRAWINGS

FIG. 14 is an explanatory drawing illustrating generation of an angle-synthesized frame.

FIG. 24 is an explanatory drawing illustrating a shift information-time information correlation table.

FIG. 34 is an explanatory drawing illustrating a state of frames to be switched in a fourth modified example of the present invention.

DESCRIPTION OF EMBODIMENTS

Embodiment 1

A video image display device, a video image display method, a program and a video image processing/display system in a first embodiment of the present invention will be explained referring to the attached drawings.

Figure 1:
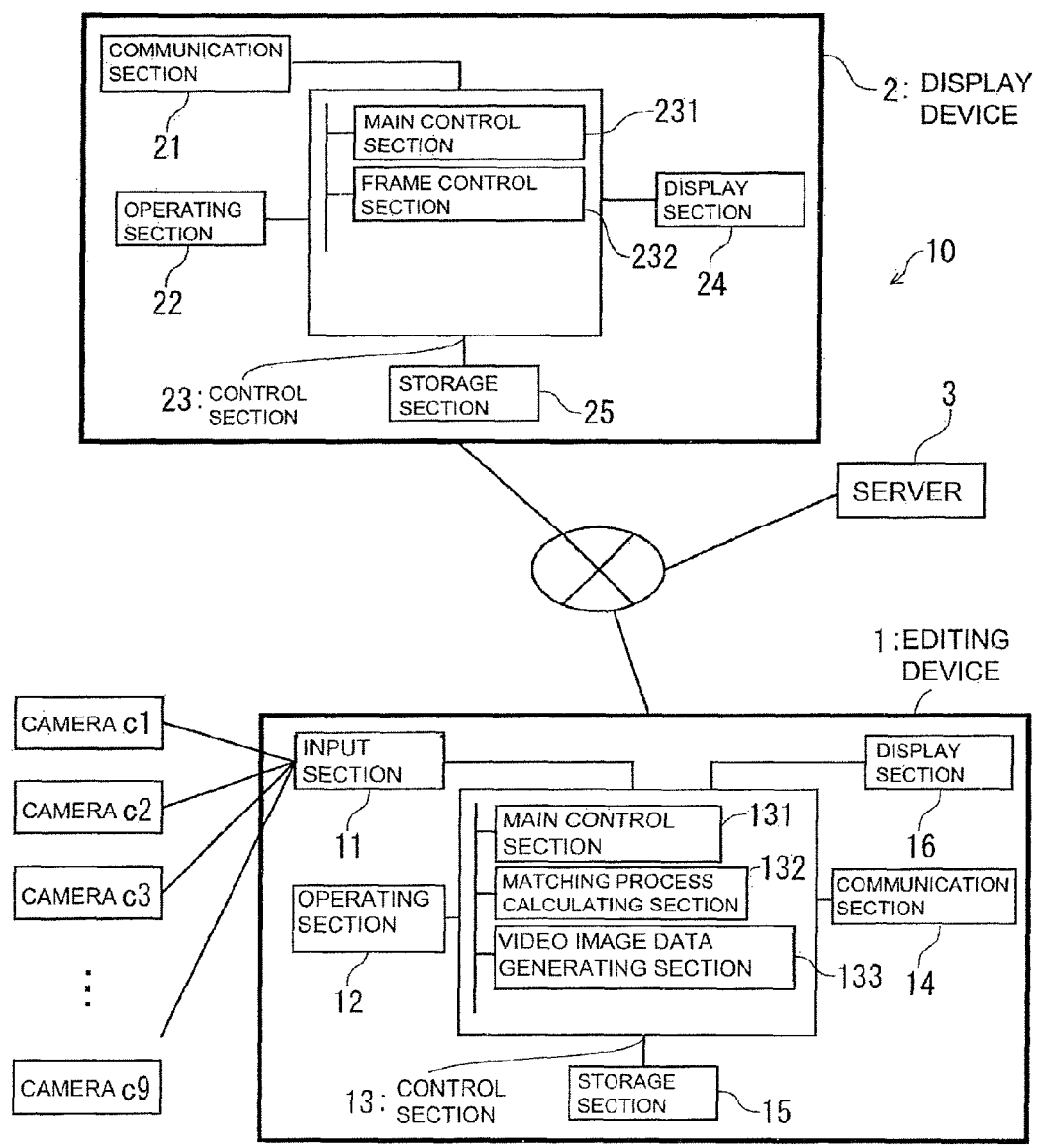
FIG. 1 is an overall configuration diagram illustrating a video image processing/display system in a first embodiment of the present invention.

FIG. 1 is an overall configuration diagram illustrating a video image processing/display system 10 according to a first embodiment of the present invention.

The video image processing/display system 10 has an editing device (video image processing device) 1 which edits video image, a display device (video image display device) 2 which displays the video image, and a server 3 which stores data of the video image. The editing device 1, the display device 2, and the server 3 are connected through a network.

The editing device 1 has a control section 13 which controls the entire device, an input section (input unit) 11 to which video image data is input from the outside, and an operating section 12 which accepts various operations by the user. The editing device 1 also has a storage section 15 which stores video image data and so forth, a communication section (output unit) 14 which takes part in communication processing, and a display section 16 which displays an editing screen and video image.

The input section 11 receives video image output from a plurality of cameras c1 to c9, and outputs the video image to the control section 13.

The operating section 12 is typically composed of a mouse, a touch pad, a button or the like capable of moving a pointer on the screen, accepts various instructions issued by the user, and outputs an instruction signal to the control section 13.

The storage section 15 is typically composed of a hard disk, a memory or the like, and stores not only the video image data received by the input section 11 and the time/angle video image data described later, but also various programs, work data and so forth.

The communication section 14 sends the time/angle video image data to the server 3.

The display section 16 is composed of a monitor or the like, and displays an editing screen for editing the video image.

The control section 13 has a main control section 131, a matching process calculating section (size matching unit, tilt matching unit, center point matching unit, time matching unit) 132 which subjects the video image data to a matching process, and a video image data generating section (time/angle video image data generating unit) 133 which generates the time/angle video image data from the video image data.

The main control section 131 controls the entire control section 13.

The matching process calculating section 132 subjects the video image data received from the input section 11 to a size matching process, a tilt matching process, a center point matching process and a time matching process described later.

The video image data generating section 133 sets a time code (time identification information) and angle code (angle identification information) for the video image data received by the input section 11, to thereby generate the time/angle video image data.

The display device 2 has a control section 23 which controls the entire device, a communication section 21 which takes part in communication process, and an operating section (instruction input unit, shift unit) 22 which accepts various operations by the user. The display device 2 also has a display section (display unit) 24 which displays the video image, and a storage section 25 which stores the time/angle video image data.

The communication section 14 receives the time/angle video image data sent from the server 3, and outputs the time/angle video image data to the control section 23.

The operating section 22 is typically composed of a mouse, a touch pad, a button or the like capable of moving a pointer (angle switching instruction display) on the screen, accepts various instructions issued by the user, and outputs an instruction signal to the control section 23.

The display section 24 is typically composed of a monitor or the like, and displays video image such as the time/angle video image data stored in the storage section 25.

The storage section 25 is typically composed of a hard disk, a memory or the like, and stores not only the time/angle video image data, but also various programs, work data and so forth.

The control section 23 has a main control section 231, and a frame control section (read-out unit) 232 which controls output of the frames of the time/angle video image data.

The main control section 231 controls the entire control section 23.

The frame control section 232 reads out the frames according to the time code and the angle code, and outputs them to the display section 24.

The server 3 has an unillustrated storage section which stores data. The server 3 stores the time/angle video image data sent from the editing device 1 into the storage section, and upon receiving an sending instruction sent from the display device 2, sends the time/angle video image data to the display device 2.

Next, operations of the thus-configured video image processing/display system 10 in the first embodiment will be explained.

The explanation begins with setting of the cameras and provisional shooting using a reference object.

Figure 2:
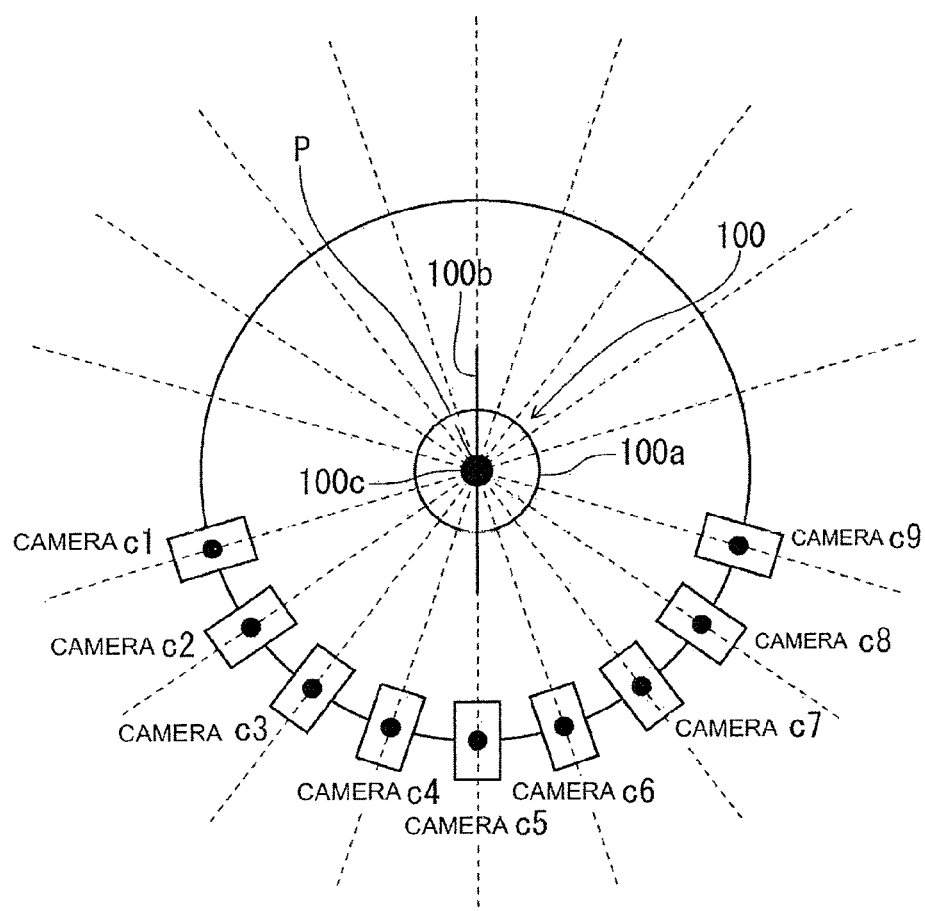
FIG. 2 is an explanatory drawing illustrating setting positions of the cameras and an reference object in provisional shooting.

As illustrated in FIG. 2, cameras c1 to c9 and a reference object 100 are set, according to the position of shooting.

The cameras c1 to c9 are arranged on a circle line assuming a shooting point P where an actual object will be placed as the center point. The radius of the circle is set to 1 m to 10 m, for example. The cameras c1 to c9 are respectively faced to the shooting point P, and are arranged at regular intervals in the circumferential direction. Now, what is installed so as to be faced directly forward to the shooting point P is the camera c5. The cameras c1 to c4 and the cameras c6 to c9 are installed symmetrically with the center line which passes through the camera c5 and the shooting point P.

The reference object 100 is set at the shooting point P as a referential object which is temporarily used for the matching process. The reference object 100 has a sphere 100$a$ composed of translucent glass, acrylic resin or the like, a reference shaft 100$b$ composed of metal, and passes through the center point of the sphere 100$a$, and a reference center unit 100$c$ fixed to the center point in the sphere 100$a$.

The reference shaft 100$b$ is fixed so as to pass through the center point and to penetrate the sphere 100$a$. While the reference shaft 100$b$ is illustrated in FIG. 2 so as to be laid horizontally for the convenience of explanation, the reference shaft 100$b$ in reality is installed as being stood vertically on the floor at the shooting point P.

The reference center unit 100$c$ has an unillustrated light source, and is configured to emit light according to a desired time schedule.

With the reference object 100 set at the shooting point P, the provisional shooting is conducted using the cameras c1 to c9. In this process, the light source of the reference center unit 100$c$ is instantaneously allowed to flash according to a desired time schedule, and state of this emission is also recorded by the provisional shooting. Quality of video image is typically set to 30 fps, which means 30 frames per second.

Next, operations of the editing device 1 which subjects the video image data to pre-processes such as matching process will be explained, referring to FIG. 3.

The user, while viewing the editing screen displayed on the display section 16, issues through mouse operation an instruction which directs capture of the video image data in the provisional shooting. Upon receiving an user operation for directing capture of the video image data, the operating section 12 outputs a capture instruction signal to the control section 13 (step S1). Upon receiving the capture instruction signal, the main control section 131 of the control section 13 outputs an output instruction signal through the input section 11 to the camera c1 (step S2). Upon receiving the output instruction signal, the camera c1 outputs the video image data in the provisional shooting and camera identification information (step S3). The camera identification information is an identification code (binary data) unique to the camera c1, and is written into a predetermined position in the video image data. Each of the cameras c1 to c9 is, of course, assigned with a unique camera identification information.

Upon receiving the video image data and the camera identification information output from the camera c1 through the input section 11, the main control section 131 stores the video image data and the camera identification information into the storage section 15 (step S4). The main control section 131 determines whether capturing of the video image data from the all of the cameras c1 to c9 has been completed or not (step S5). More specifically, the main control section 131 determines the event, according to whether the camera identification information is stored in the storage section 15 or not. Having described in this embodiment that the main control section 131 automatically determines capture of the video image data by all of the cameras c1 to c9, the embodiment is not limited thereto, wherein the main control section 131 may capture the video image data from a specified number of cameras according to the instruction by the user.

If it is determined that the capture of video image data has not completed (step S5: NO), the main control section 131 reads the output from the input section (an input port beside the camera c1) 11, and repeats the operations of steps S4, S5. On the other hand, if it is determined that the capture of video image data has completed (step S5: YES), the main control section 131 outputs a size matching process instruction signal to the matching process calculating section 132.

Figure 4:
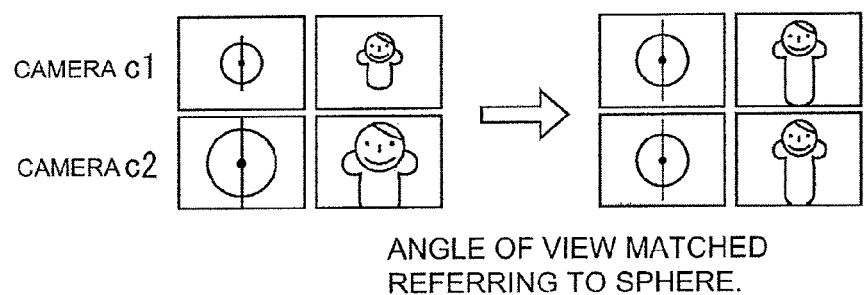
FIG. 4 is an explanatory drawing illustrating a size matching process.

Upon receiving the size matching process instruction signal, the matching process calculating section 132 executes the size matching process (step S6). That is, as illustrated in FIG. 4, the matching process calculating section 132 reads the video image data of the cameras c1 to c9 from the storage section 15, and calculates video image size information respectively for the individual video image data, so as to match all the video image sizes of the sphere 100a. More specifically, by an image recognition process, the matching process calculating section 132 calculates enlarged sizes with which all the video image sizes of the individual spheres 100a will agree, and defines these enlarged sizes as video image size information. Now, the video image size of the sphere 100a, which serves as the reference, is preliminarily set by an operation through the operating section 12 by the user.

The matching process calculating section 132 stores the individual video image size information into the storage section 15, while correlating them with the camera identification information.

Figure 5:
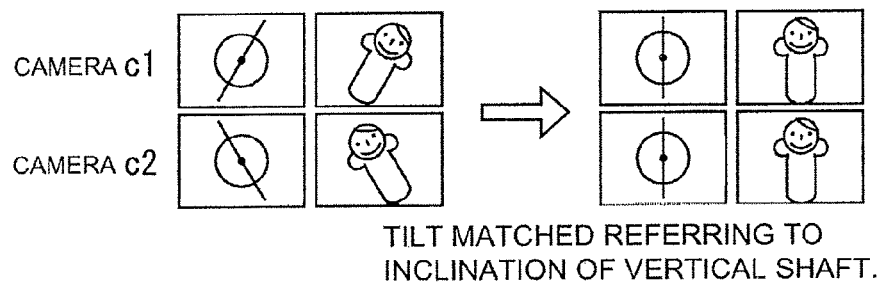
FIG. 5 is an explanatory drawing illustrating a tilt matching process.

The matching process calculating section 132 then executes a tilt matching process (step S7). That is, as illustrated in FIG. 5, the matching process calculating section 132 calculates video image tilt information respectively for the individual video image data, so as to match in the video image all the tilts of the reference shaft 100b of the video image data from the cameras c1 to c9. More specifically, by an image recognition process, the matching process calculating section 132 calculates correction angles by which all the reference shafts 100b are aligned in the vertical direction (upward/downward) in the video image, and defines these correction angles as the video image tilt information.

The matching process calculating section 132 stores the individual video image tilt information into the storage section 15, while correlating them with the camera identification information.

Figure 6:
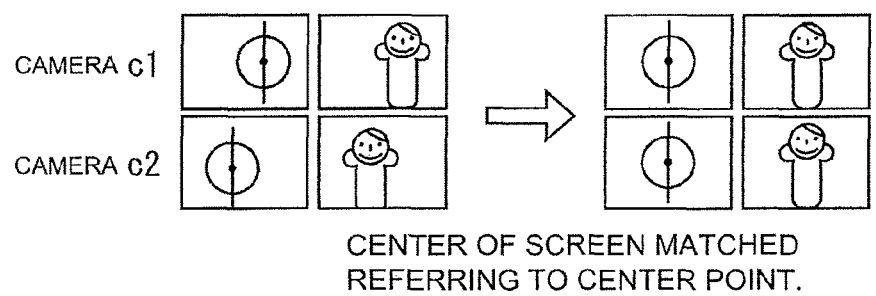
FIG. 6 is an explanatory drawing illustrating a center point matching process.

The matching process calculating section 132 further executes a center point matching process (step S8). That is, as illustrated in FIG. 6, the matching process calculating section 132 calculates video image center point information respectively for the individual video image data, so that all the positions, in the video image, of the reference center unit 100c in the video image data from the cameras c1 to c9 are matched to the center point of the video image. More specifically, the matching process calculating section 132 calculates, by an image recognition process, center shift information (shifts from the center point on the coordinate system) with which all the individual reference center units 100c are matched to the center point in the video image. These center shift information are defined as the video image center point information.

The matching process calculating section 132 stores the individual video image center point information into the storage section 15 while correlating them with the camera identification information.

Figure 7:
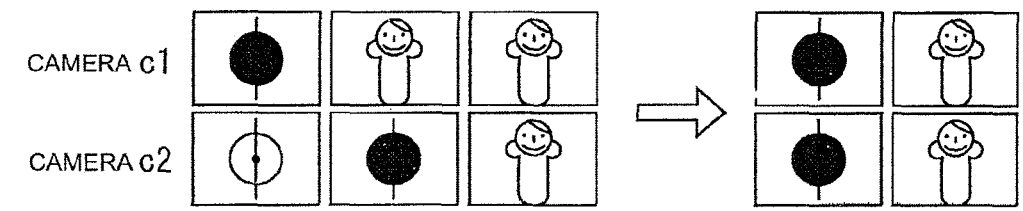
FIG. 7 is an explanatory drawing illustrating a time matching process.

The matching process calculating section 132 then executes the time matching process (step S9). That is, as illustrated in FIG. 7, the matching process calculating section 132 calculates video image time information for the individual video image data, so as to match all time schedules (time axes) on the basis of the frames having bright light sources in the video image data from the cameras c1 to c9. More specifically, by the image recognition process, the matching process calculating section 132 calculates time shift information (shift on the time axis) with which all the bright frames (the frames indicated by filled circles in FIG. 7) coincide on the time axis of the video image. These time shift information are defined as the video image time information.

The matching process calculating section 132 stores the individual video image time information into the storage section 15, while correlating them with the camera identification information.

That is, the matching process calculating section 132 stores the individual video image data from the cameras c1 to c9 into the storage section 15, while correlating the video image size information, the video image tilt information, the video image center point information and the video image time information with the camera identification information.

In this way, the pre-processing operations prior to the actual object shooting are executed.

Having described in this embodiment that the size matching process, the tilt matching process, the center point matching process and the time matching process are automatically executed by the matching process calculating section 132 based on the image recognition process, the process is not limited thereto, wherein the matching process calculating section 132 may alternatively execute the individual processes upon instructed by the user. For example, the user may edit so as to match the size, tilt, center point and time through mouse operation, while viewing the display section 16.

Next, operations of the editing device 1 in the actual shooting of the object will be explained referring to FIG. 8.

While keeping the positions and angles of the cameras c1 to c9 in the pre-process operations unchanged, the reference object 100 is removed from the shooting point P illustrated in FIG. 2, and an object for actual shooting is set. Since the object in this embodiment is a human, of course the human is requested to stand on the shooting point P.

The object is then shot by the cameras c1 to c9, with a video quality of 30 fps for example.

Figure 3:
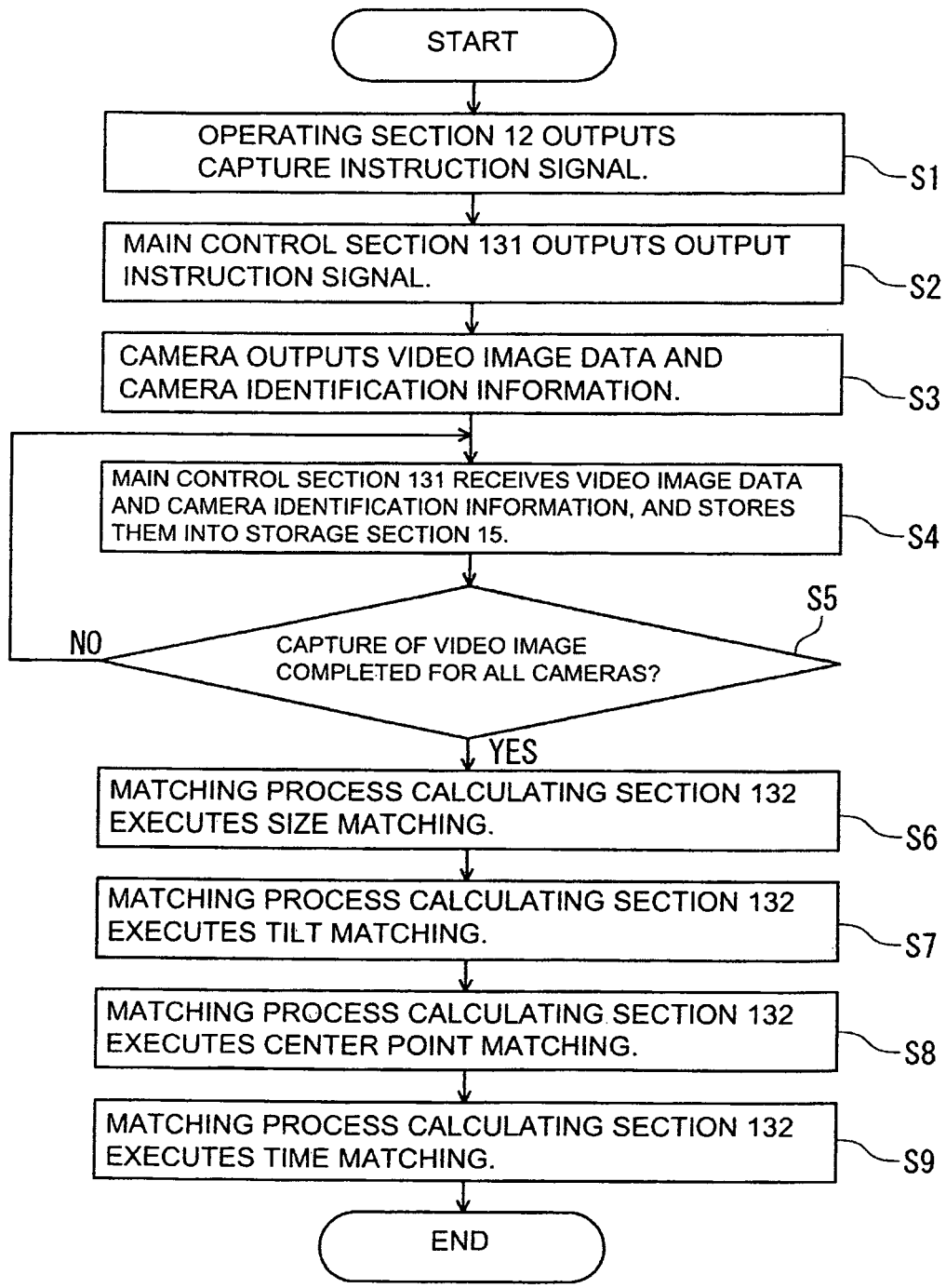
FIG. 3 is a flow chart illustrating operations in provisional shooting by an editing device shown in FIG. 1.

Operations for capturing the video image data in the actual shooting will not be explained herein, since they are same as the operations for capturing the video image data in the provisional shooting illustrated in FIG. 3 (step S1 to S5). The input step now relates to operations of the input section 11 which inputs the video image data and the camera identification information output by the cameras c1 to c9.

Given that it is determined in step S5 that the main control section 131 has finished capturing the video image data (step S5: YES).

The user directs through mouse operation to edit the video image, while viewing the editing screen displayed on the display section 16. Upon receiving an user operation for editing instruction, the operating section 12 outputs an editing instruction signal to the control section 13 (step S10). Upon receiving the editing instruction signal, the main control section 131 outputs the matching process instruction signal to the matching process calculating section 132. Upon receiving the matching process instruction signal, the matching process calculating section 132 accesses the camera identification information of the camera c1 stored in the storage section 15, and extracts the video image data correlated to the camera identification information. The matching process calculating section 132 then subjects the video image data to the matching processes such as size matching process, tilt matching process, center point matching process, time matching process and so forth (step S11).

That is, in the size matching process, the matching process calculating section 132 reads the video image size information corresponded to the camera identification information, and resizes, as illustrated in FIG. 4, the size of the video image frame by frame. More specifically, the matching process calculating section 132 enlarges or shrinks the current video image data up or down to a predetermined size, by multiplying the video image size of the current video image data by the video image size information.

Then in the tilt matching process, the matching process calculating section 132 reads the video image tilt information corresponded to the camera identification information, and corrects, as illustrated in FIG. 5, the tilt of the video image frame by frame. More specifically, the matching process calculating section 132 vertically corrects the tilt of the current video image data, by adding the video image tilt information to the tilt angle of the current video image data.

Then in the center point matching process, the matching process calculating section 132 reads the video image center point information corresponded to the camera identification information, and corrects, as illustrated in FIG. 6, the position of the center point of the video image frame by frame. More specifically, the matching process calculating section 132 corrects the position of the center point of the current video image data, by adding the video image center point information to the position of the center point of the current video image data.

Then in the time matching process, the matching process calculating section 132 reads the video image time information corresponded to the camera identification information, and corrects, as illustrated in FIG. 7, the time of the video image frame by frame. More specifically, the matching process calculating section 132 corrects the time of the current video image data, by adding the video image time information to the time information of the current video image data.

By executing these matching processes for all of the video image data from the cameras c1 to c9, the size, the tilt, the position of the center points and the timing of all of the video image data are matched.

Upon completion of the matching process, the matching process calculating section 132 outputs a completion signal to the main control section 131. Upon receiving the completion signal, the main control section 131 outputs the generation instruction signal to the video image data generating section 133.

Upon receiving the generation instruction signal, the video image data generating section 133 generates the time/angle video image data from the matched video image data (step S12: time/angle video image data generation step).

That is, the video image data generating section 133 assigns a time code (TC) to the matched video image data frame by frame, sequentially from the first frame to the last frame. The time code herein is an identification code (binary data) used for identifying the position on the time axis of each frame, and is written at a predetermined position of each frame. The video image data generating section 133 also assigns an angle code (AC) unique to the matched video image data. The angle code herein is an identification code (binary data) unique to each of the cameras c1 to c9, used for indicating the position by angles, and is written at a predetermined position of video image data. While the angle code may newly be generated, in this embodiment, the already-written camera identification information will be used also as the angle code, without newly generating it. Accordingly, the time/angle video image data means the video image data having the time code and the angle code assigned frame by frame.

The video image data generating section 133 stores the thus-generated time/angle video image data with a generation completion flag set ON into the storage section 15, and outputs a generation completion signal to the main control section 131.

Upon receiving the generation completion signal, the main control section 131 determines whether generation of the time/angle video image data for all of the cameras c1 to c9 has completed or not (step S13). That is, the main control section 131 determines the above, based on ON/OFF of the generation completion flag of the time/angle video image data stored in the storage section 15. Upon determined that the generation of the time/angle video image data has not completed (step S13: NO), the main control section 131 reads the video image data from the storage section 15 based on the next camera identification information. Operations in steps S11, S12 by the matching process calculating section 132 and the video image data generating section 133 are repeated. Meanwhile, upon determined that the generation of the time/angle video image data has completed (step S13: YES), the main control section 131 reads out the output of the operating section 12 (step S14).

Upon reading the sending instruction signal output by the operating section 12, as directed by an user operation for sending instruction, the main control section 131 reads the time/angle video image data of the cameras c1 to c9 out from the storage section 15, and then sends them through the communication section 14 to the server 3 (step S15: output step).

In this way, the time/angle video image data is stored in the server 3.

Next, display operation of the time/angle video image data in the display device 2 will be explained, referring to FIG. 9.

Upon receiving an user operation for directing capture of the video image, the operating section 22 outputs the capture instruction signal to the control section 23 (step S21). Upon receiving the capture instruction signal, the main control section 231 of the control section 23 receives the time/angle video image data through the communication section 21 from the server 3, and stores them into the storage section 25 (step S22). The operating section 22 then accepts an user operation for directing display of the video image, and outputs a display instruction signal to the control section 23 (step S23).

Figure 10:
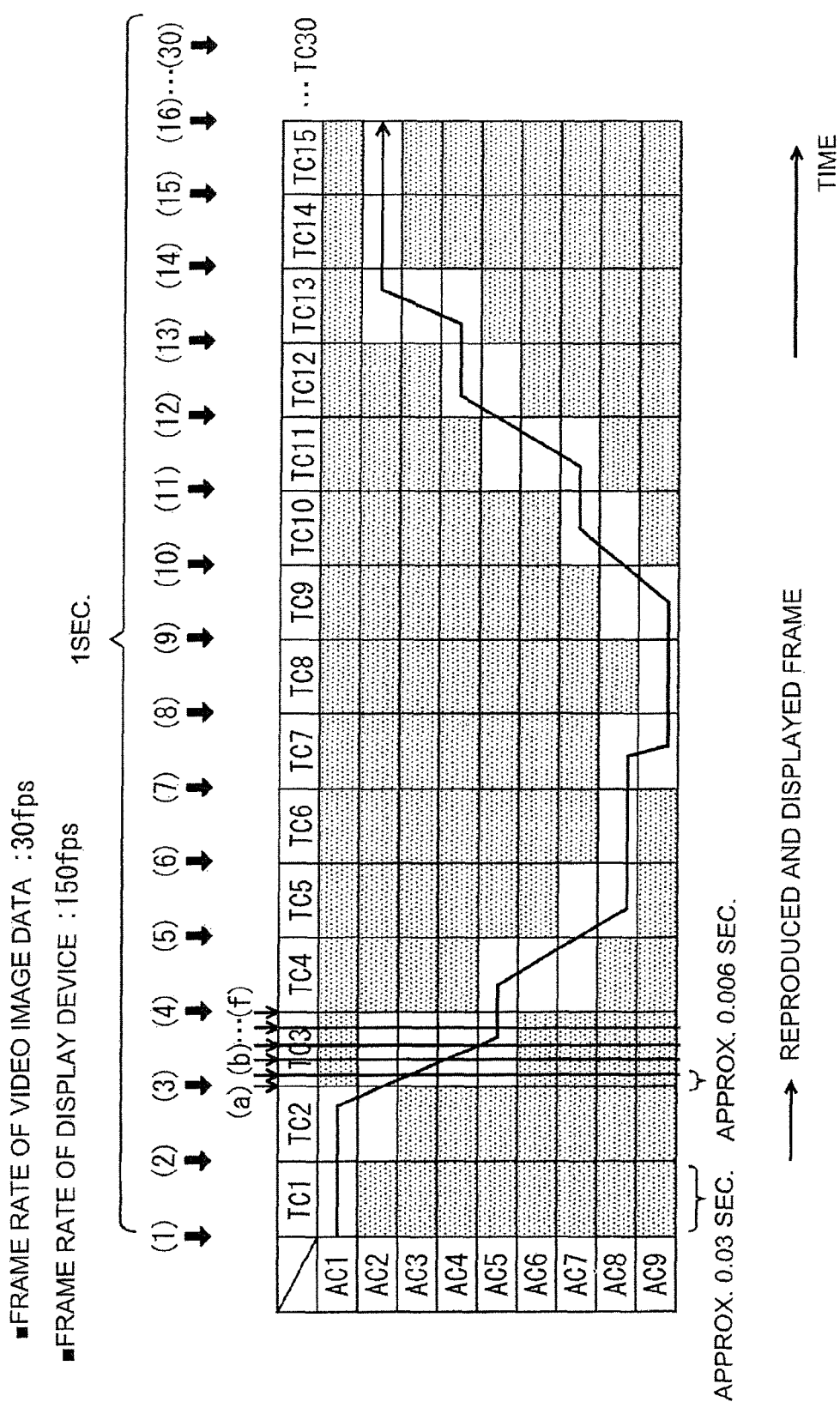
FIG. 10 is an explanatory drawing illustrating a state of frames to be switched during the display of video image by the display device shown in FIG. 1.

Upon receiving the display instruction signal, the main control section 231 outputs a frame control signal to the frame control section 232. Upon receiving the frame control signal, the frame control section 232 accesses, as illustrated in FIG. 10, the angle code (AC1) of the camera c1, and reads the frame assigned with the first time code (TC1), among from the time/angle video image data corresponded to the angle code (reading out step). The frame control section 232 then outputs the frame to the display section 24 (step S24). The display section 24 reproduces the frame and displays it on the screen (step S25: display step). In the same way, the frame control section 232 successively outputs the frames assigned with the same angle code (AC1), in the order of time code, and the display section 24 then successively reproduces the frames with a video quality of 30 fps. The video image is thus displayed.

When the angle switching is directed through an operation on the operating section 22 by the user, the operating section 22 outputs the coordinate information of a pointer on the display screen of the display section 24, to the control section 23 (step S26: angle switching instruction input step). Upon receiving the coordinate information, the main control section 231 outputs it to the frame control section 232.

Figure 25:
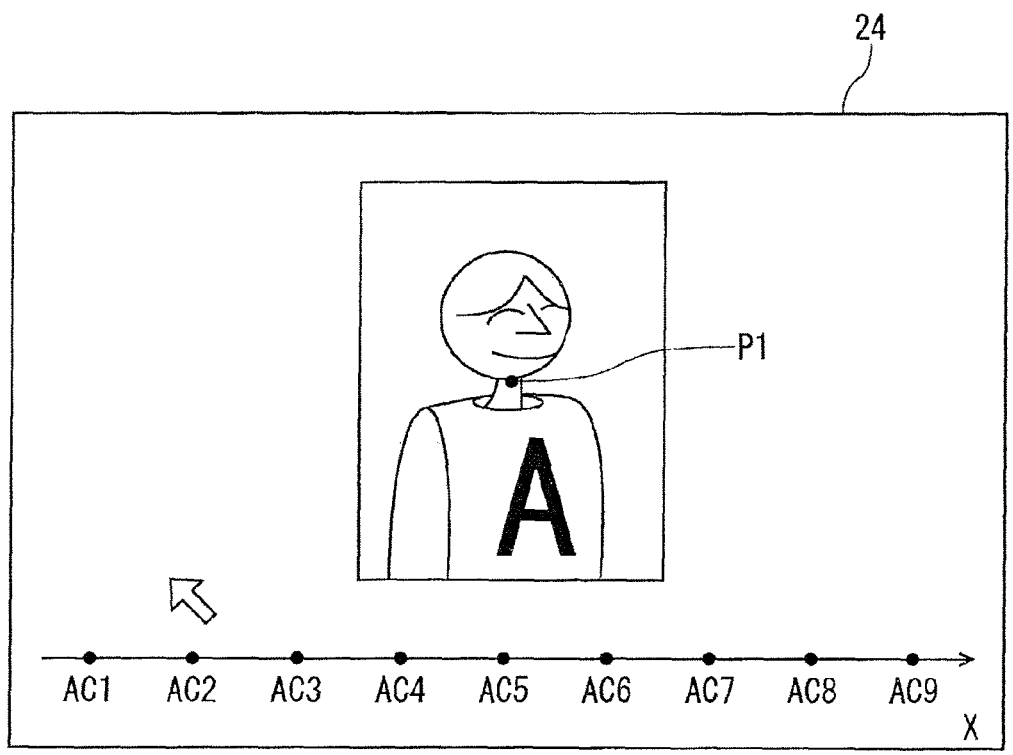
FIG. 25 is an explanatory drawing illustrating a display screen of a display section shown in FIG. 1.

Now, the coordinates on the display screen of the display section 24 is correlated to each angle code. That is, as illustrated in FIG. 25, on the coordinate system in the direction of the x-axis (transverse direction) on the display screen, distinct angle codes are assigned to every 20 points, such as AC1 for 0 to 19, AC2 for 20 to 39, AC3 for 40 to 59, AC4 for 60 to 79, AC5 for 80 to 99, AC6 for 100 to 119, AC7 for 120 to 139, AC8 for 140 to 159, and AC9 for 160 to 179. The correlation is stored in the form of correlation table in the storage section 25. These angle codes are sequentially assigned rightward on the x-axis of the display screen, corresponding to the counterclockwise order of the cameras c1 to c9 arranged in the circumferential direction illustrated in FIG. 2. That is, the shooting point P shown in FIG. 2 and the display center point P1 of the display area on the display screen shown in FIG. 25 are matched, and the angle codes are assigned so that the actual order of arrangement of the cameras c1 to c9 is matched to the order on the coordinate system on the display screen. In other words, the angle codes are correlated to the instruction display coordinate system so that the angle on the display screen with respect to the display center point P1 in the instruction display coordinate system will agree with the angle of the video image to be displayed. Note that AC1 to AC9 are shown in FIG. 25 merely for the convenience of explanation, and are of course not displayed on the actual display screen.

Now the user directs angle switching, by transversely moving the pointer on the display screen through mouse operation. That is, the coordinate information of the pointer serves as the angle switching instruction signal. In this way, the coordinate system on the display screen of the display section 24 functions as an instruction display coordinate system and an instruction coordinate system for the angle switching instruction issued by the user.

Upon receiving the coordinate information output by the operating section 22, the frame control section 232 extracts a switched angle code from the correlation table stored in the storage section 25 based on the coordinate information, reads the frame assigned with the switched angle code and under the same time code (switching read-out step), and outputs it to the display section 24 (step S27). In this process, the frame control section 232 divides the entire range of shift of the pointer from the start point to the end point into segments each having a range shorter than the entire range of shift, and extracts the angle codes every time the segment advances. That is, over the entire range of shift of the pointer from the start point to the end point, the frame control section 232 successively extracts the angle code for every segment. In other words, when the pointer continuously moves across the adjacent angle code in the instruction display coordinate system, the operating section 22 successively outputs the coordinate information to the frame control section 232, and the frame control section 232 successively extracts the angle codes corresponded to the coordinate information.

The display section 24 displays the frames while successively switching the switched frames (step S28: switching display step).

For example, assuming now that, as illustrated in FIG. 10, while the frame assigned with angle code AC1 is displayed on the display section 24 under time code TC2, the pointer is moved from the start point (15,0) to the endpoint (25,0) by an user operation. The frame control section 232 extracts an angle code corresponded to point (16,0) which represents an 1-point-long segment laterally adjacent to the start point (15, 0). The angle code at that time is AC1, which remains unchanged. The frame control section 232 repeats step S27 for every point, and when the pointer reached the coordinates of point (20,0), switches the angle code to be extracted to AC2. The frame control section 232 then reads the frame with angle code AC2 under the same time code TC2, and outputs it to the display section 24.

Figure 11:
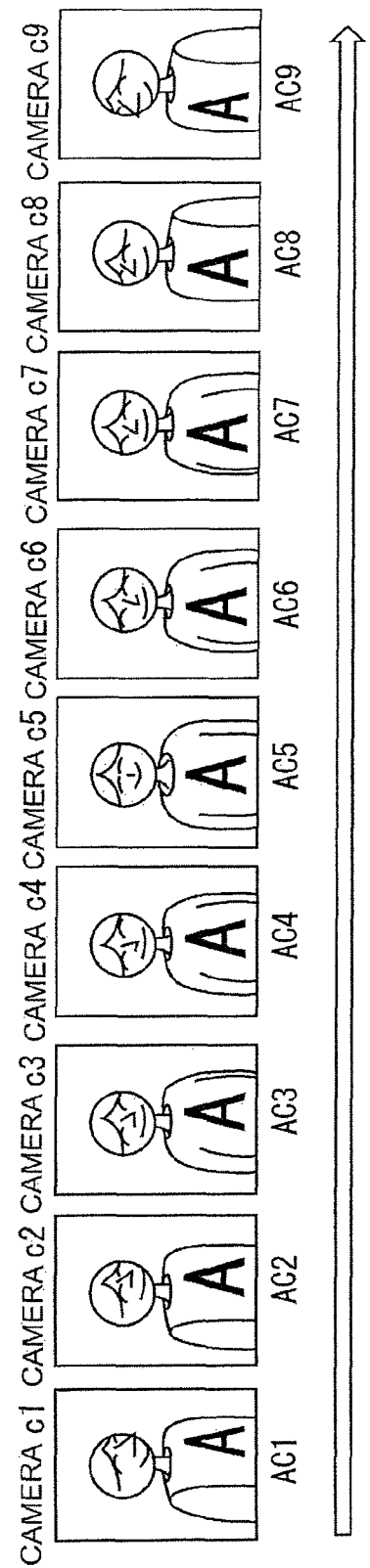
FIG. 11 is an explanatory drawing illustrating appearances of images sequentially switched during the display of video image by the display device shown in FIG. 1.
Figure 12:
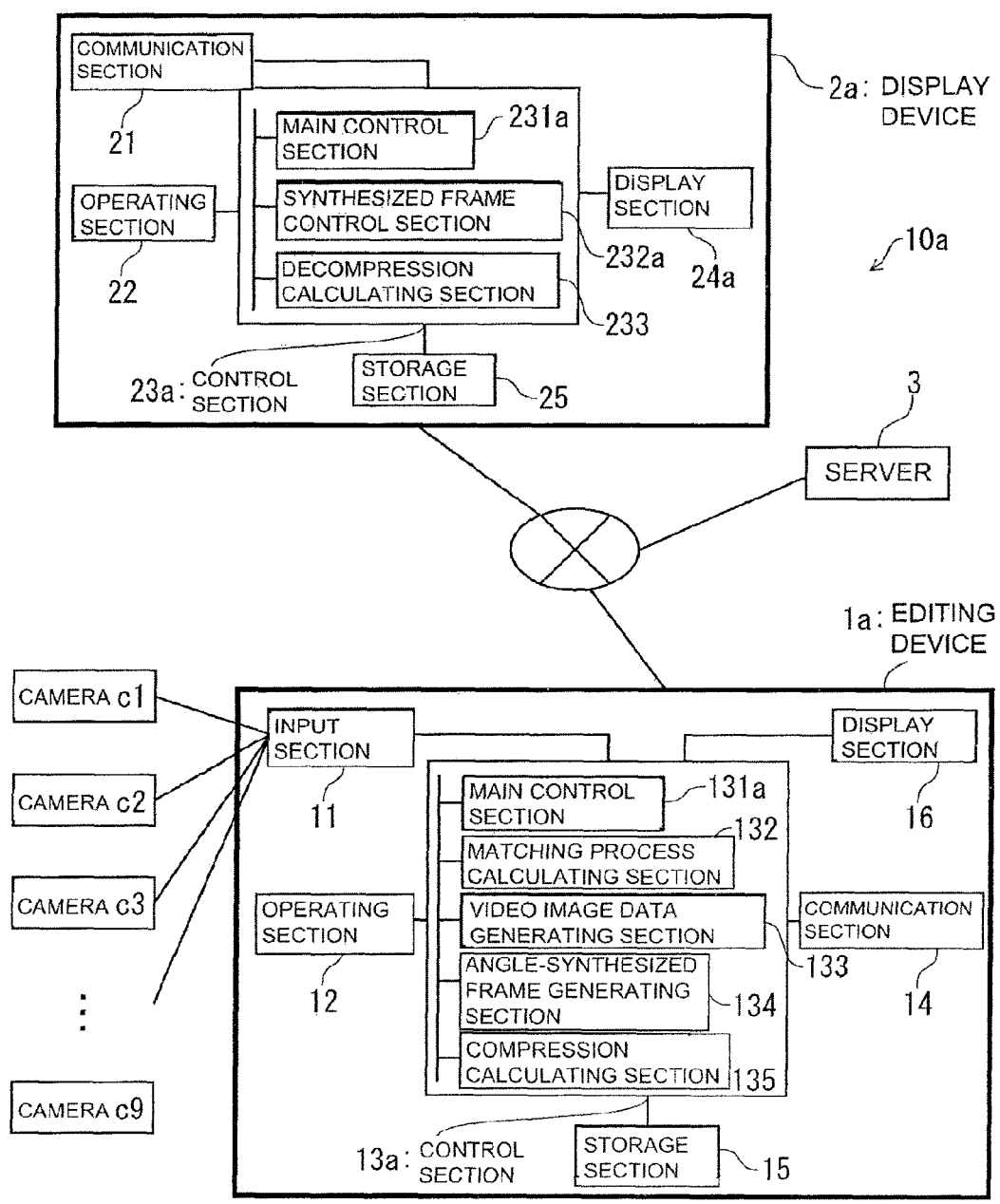
FIG. 12 is an overall configuration diagram illustrating a video image processing/display system in a second embodiment of the present invention.

While the frame with time code TC3 and angle code AC3 is displayed on the display section 24, and upon directed by the user to switch the angle through movement of the pointer from AC3 to AC5, across the adjacent angle code, within the display period of a single frame at 30 fps, the frame control section 232 extracts the angle code which represents an 1-point-long segment, in the same way as described above. That is, for the case where the pointer moves from (30,0) to (50,0), one-point movement of the pointer from (30,0) to (40,0) allows the frame control section 232 to output the adjacent frame with angle code AC4 and the same time code TC3 to the display section 24, and, movement up to (50,0) allows output of the adjacent frame with angle code AC5 adjacent to AC4 under the same time code TC3 to the display section 24. In this way, as illustrated in FIG. 11, under the same time code, upon receiving instruction for angle switching across the adjacent angle code within the display period of a single frame at 30 fps, the frame with the adjacent angle code up to the frame with the angle code directed to be switched, including all frames in between, all under the same time code, are sequentially and successively displayed on the display section 24.

Paragraphs below will detail the frame rate and angle switching.

The frame rate includes the frame rate of the time/angle video image data, and the frame rate of the display device 2. The frame rate of the time/angle video image data is generally, and actually herein, set to 30 fps or below, since the quality represented by an excessively high frame rate is not recognizable to human, due to limited visual literacy of human.

On the other hand, with advancement in the processing performance on the hardware basis, the display device 2 may have a reproduction/display performance represented by the frame rate not smaller than that of the time/angle video image data, and may set even up to 60 fps, 90 fps, 120 fps, 150 fps and so on, for example. Suppose now that the frame rate of the display device 2 is set higher than the frame rate of the time/angle video image data. In this case, the frame-by-frame read cycle of the time/angle video image data, which is read by the frame control section 232 based on the angle switching instruction input through the operating section 22, is shorter than the frame rate of the video image data.

FIG. 10 illustrates an exemplary case where the frame rate of the time/angle video image data is set to 30 fps, whereas the frame rate of the display device 2 is set to 150 fps. Note that, while the thin arrows in FIG. 10 are indicated by "(a)(b) . . . (f)" for the convenience of easy recognition of the marks, these six thin arrows are, of course, actually corresponded to (a)(b)(c)(d)(e)(f).

Now, the frame rate of the time/angle video image data is set so as to be read sequentially from frames (1) to (30) shown in FIG. 10 (30 frames) at time intervals indicated by downward thick arrows (approximately at 0.03-second intervals), whereas the frame rate of the display device 2 is set so as to be read sequentially from frames (a) to (f) shown in FIG. 10, five frames in total, for every single frame of the time/angle video image data (for example, the frame with TC3), at time intervals indicated by downward thin arrows (approximately at 0.006-second intervals). That is, the frame control section 232 reads the individual frames at the time intervals (approximately at 0.006-second intervals), based on the time codes and the angle codes.

In this case, upon receiving the angle switching instruction typically within the time interval between the thin arrows (a) and (b) (approximately a 0.006-second interval), the angle switching instruction is cached, and the frame control section 232 reads the frame at the time indicated by the thin arrow (b), based on the time code same as the previous one, and the angle code directed to be switched. Upon further receiving the angle switching instruction typically within the time interval between the thin arrows (b) and (c) (approximately a 0.006-second interval), the angle switching instruction is cached in the same way, and the frame control section 232 reads the frame at the time indicated by the thin arrow (c), based on the time code same as the previous one, and the angle code directed to be switched.

In short, upon successive input of the respective angle switching instructions over the time period represented by the thin arrows (a) through (b) to (c), the angle switching instructions are cached in the respective time intervals, and the frame control section 232 sequentially and successively reads the frames at the time indicated by the thin arrows (b) and (c), respectively based on the time code same as the previous one, and the angle code directed to be switched. The display section 24 then displays these frames in a sequential and successive manner.

As described above, for the case where the frame rate of the display device 2 is higher than the frame rate of the time/angle video image data, one frame of the display device 2 is divided into time segments shorter than one frame of the time/angle video image data. In short, read cycles (a) to (f) with which the frames are read by the control section 232, upon directed by the angle switching instruction received from the operating section 22, becomes shorter than the frame periods (1) to (30) of the time/angle video image data.

Accordingly, upon successive input of the angle switching instructions through the operating section 22, at the time intervals shorter than the frame rate of the time/angle video image data, the frame control section 232 sequentially and successively reads these frames directed for angle switching at such short time intervals, and the display section 24 then displays the thus-read frames at such short time intervals in a sequential and successive manner.

As described above, according to the display device 2, the video image display method, the program and the video image processing/display system 10 of this embodiment, it now becomes possible to reproduce and display only the frame of a single correspondent time/angle video image data, and to allow angle switching display frame-by-frame, based on the time code and the angle code, without independently reproducing the frames of other time/angle video image data, and thereby video images at angles in which the user wishes to view may be switched in a real time manner, while suppressing the load on the machine.

Since, when the pointer continuously shifts across the adjacent angle code in the instruction display coordinate system, the frame control section 232 successively extracts the angle codes corresponded to the coordinate information of the pointer, so that the angle may be switched in a successive and sequential manner according to the shift of the pointer, simply by a series of operations such that the user moves the pointer in the transverse direction. Accordingly, the angle may naturally and smoothly be switched with better matching to the shift of the user's point of view.

Since the angle codes are correlated to the instruction display coordinate system so as to match the angle with respect to the display center point P1 on the display screen, with the angle of the video image to be displayed, so that it now becomes possible to match the position of the pointer relative to the display center point P1 and the angle of the video image to be displayed, and thereby the angle may naturally and smoothly be switched with better matching to the shift of the user's point of view.

Since the frame control section 232 reads the correspondent frames independently frame by frame based on the time code and the angle code, without reproducing other frames, and the display section 24 successively reproduces and displays them independently frame by frame, so that the frame-by-frame angle switching display is implemented in a reliable manner.

Since the video image data generating section 133 generates the time/angle video image data from the video image data, it now becomes possible to generate the video image data correlated with the time code and the angle code frame by frame, so that the frame-by-frame angle switching display on the display device 2 is implemented in a reliable manner.

Since the video image data generating section 133 generates the time/angle video image data from the video image data, it now becomes possible to make the video image data, assigned frame by frame with the time code and the angle code, independent frame by frame, so that the angle switching display on the display device 2 is implemented in a reliable manner, by virtue of the reproduction and display which are independent frame by frame.

Also since the matching process calculating section 132 executes the size matching process, the tilt matching process, the center point matching process and the time matching process, it now becomes possible to match the size, tilt, center point of the object on the screen, and time of motion of the object, and thereby the angle may naturally be switched on the display device 2, with better matching to the user's sense.

Embodiment 2

Next, a second embodiment of the present invention will be explained.

FIG. 12 to FIG. 17 are drawings illustrating the second embodiment of the present invention.

In FIG. 12 to FIG. 17, all constituents identical to those shown in FIG. 1 to FIG. 11 will be given the same symbols, and explanations therefor will not be repeated.

Basic configuration of this embodiment is same as that of the first embodiment, so that the description below will mainly deal with different aspects.

The video image processing/display system 10a has an editing device (video image processing device) 1a, a display device (video image display device) 2a, and the server 3. The editing device 1a and the display device 2a and the server 3 are connected through a network.

The editing device 1a has a control section 13a which controls the entire device. The editing device 1a has the input section 11, the operating section 12, the communication section 14, the storage section 15, and the display section 16.

The control section 13a has a main control section 131a, an angle-synthesized frame generating section (angle-synthesized frame generating unit) 134 which generates angle-synthesized frames, and a compression calculating section (compression unit) 135 which compresses the angle-synthesized frames. The control section 13a has the matching process calculating section 132 and the video image data generating section 133.

The main control section 131a controls the entire control section 13a.

The angle-synthesized frame generating section 134 extracts the frames under the same time code and different angle codes, from the video image data stored in the storage section 15, and generates the angle-synthesized frame by arranging, that is, synthesizing these frames in a matrix.

The compression calculating section 135 compresses the angle-synthesized frame. Methods of compression include, for example, a method of deleting a redundant information in the angle-synthesized frame, by discrete cosine transform or motion-compensated interframe prediction.

The display device 2a has a control section 23a which controls the entire device, and a display section (display unit) 24a on which the video image is displayed. The display device 2a has the communication section 21, the operating section 22, and the storage section 25.

The display section 24a is typically composed of a monitor, and displays the video image such as the angle-synthesized frame stored in the storage section 25.

The control section 23a has a main control section 231a, a synthesized frame control section (read-out unit) 232a which controls the output of the angle-synthesized frame, and a decompression calculating section 233 which decompresses the compressed angle-synthesized frame.

The main control section 231a controls the entire control section 23a.

The decompression calculating section 233 decompresses the compressed angle-synthesized frame, and outputs the result to the synthesized frame control section 232a.

The synthesized frame control section 232a reads the decompressed angle-synthesized frame, and outputs it to the display section 24a.

Next, operations of the thus-configured video image processing/display system 10a in the second embodiment will be explained.

Note that the setting of the cameras and the reference object 100, and pre-process operations including the matching process are same as described above in the first embodiment, and will not be explained again.

Paragraphs below will explain operations of the editing device 1a in the actual shooting of the object, referring to FIG. 13.

Figure 8:
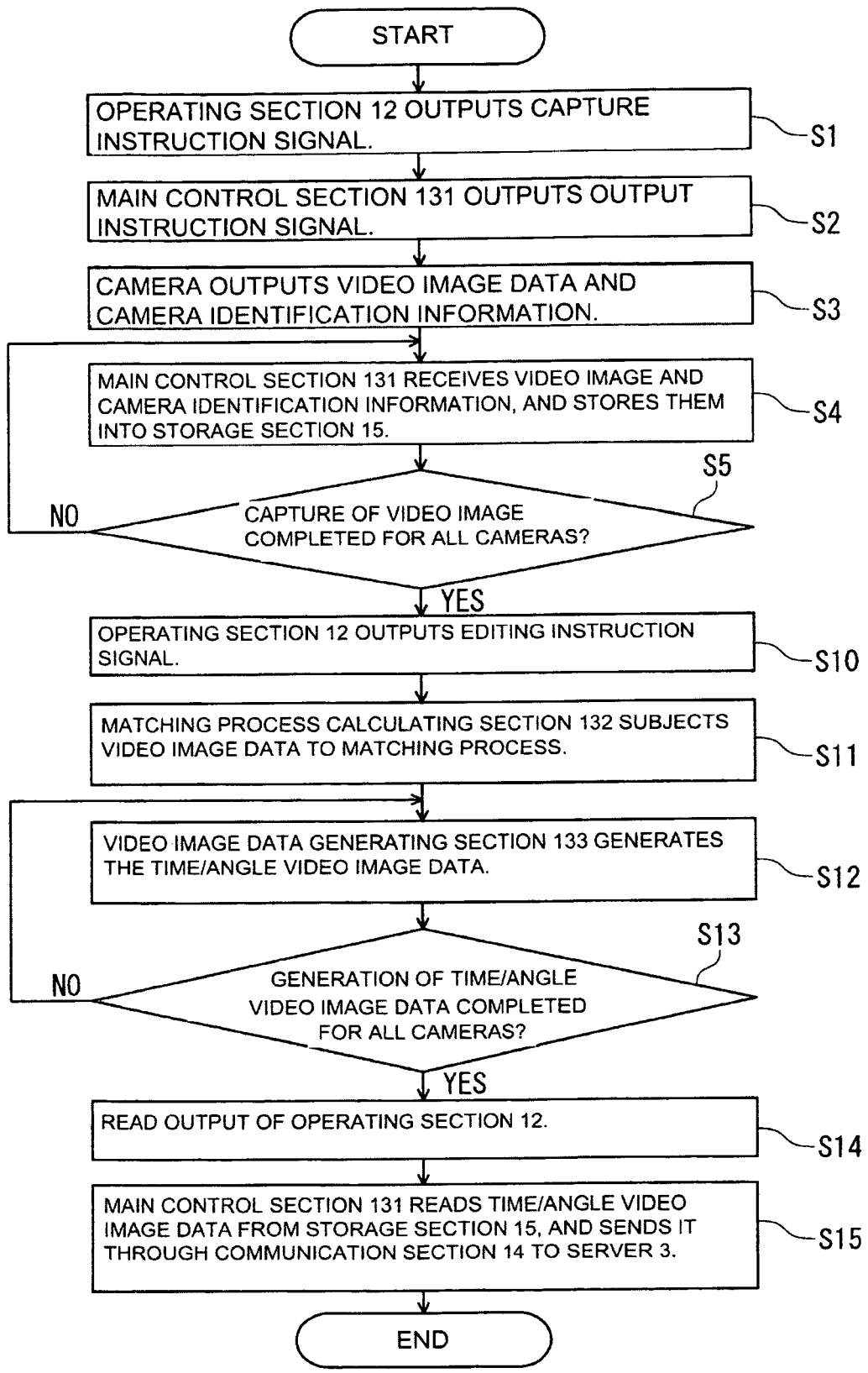
FIG. 8 is a flow chart illustrating post-shooting editing operations by the editing device shown in FIG. 1.
Figure 13:
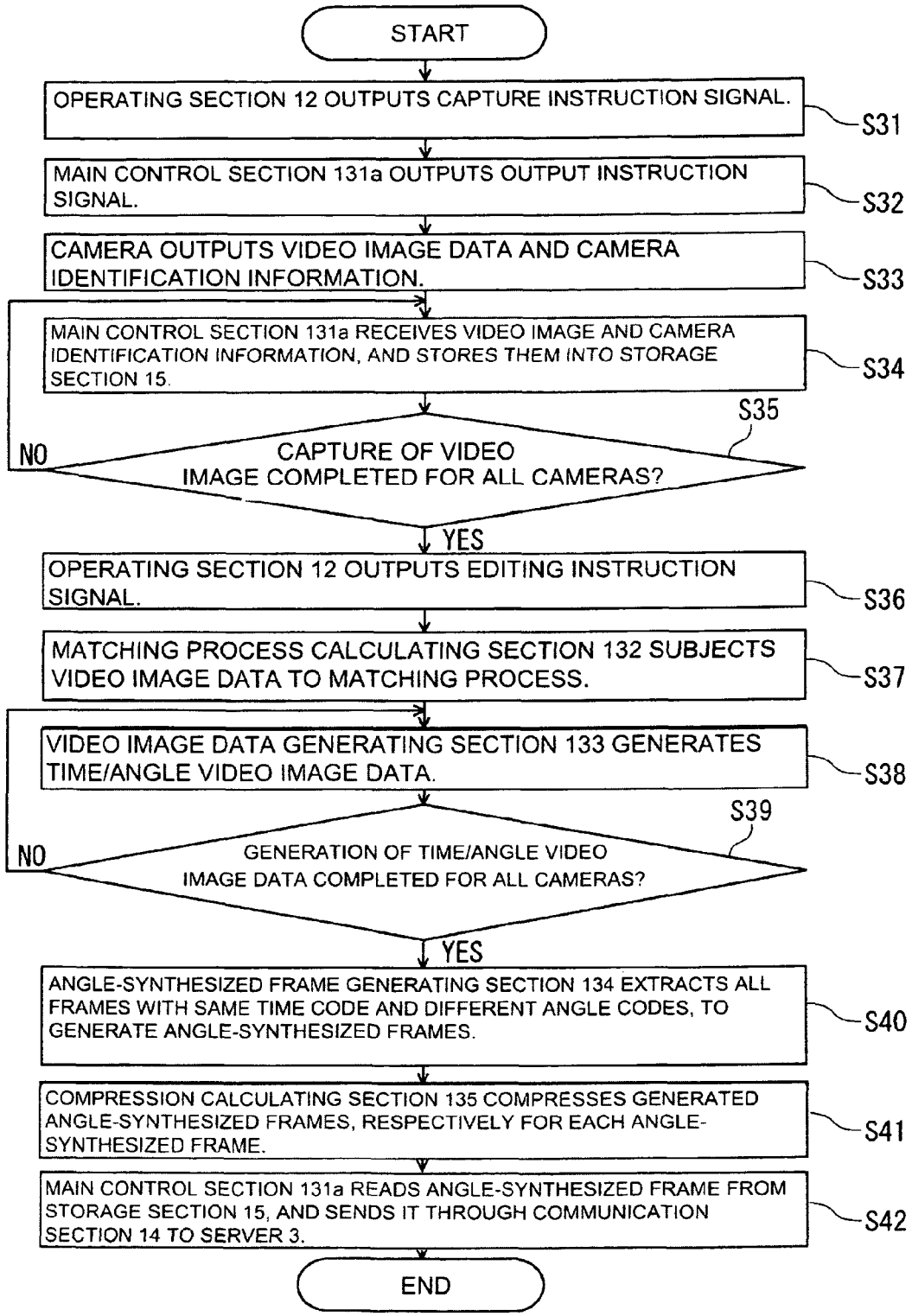
FIG. 13 is flow chart illustrating post-shooting editing operations by an editing device shown in FIG. 12.

Operations in steps S31 to S39 in FIG. 13 are same as those in steps S1 to S13 in FIG. 8, and will not be explained again.

Now, upon determined that the generation of the time/angle video image data has completed (step S39: YES), the main control section 131a outputs the synthesis instruction signal to the angle-synthesized frame generating section 134.

Figure 14:
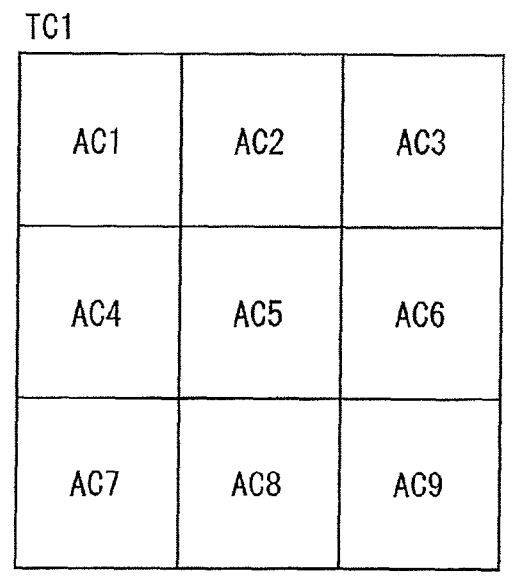

Upon receiving the synthesis instruction signal, the angle-synthesized frame generating section 134 reads the time/angle video image data stored in the storage section 15, and generates the angle-synthesized frame (step S40). That is, the angle-synthesized frame generating section 134 extracts the frames correlated to the first time code and all angle codes, and assigns them to predetermined positions. For example, as illustrated in FIG. 14, among from nine angle codes AC1 to AC9 under time code TC1, angle codes AC1 to AC3 are preliminarily allocated from the upper left to the upper right, angle codes AC4 to AC6 are preliminarily allocated from the middle left to the middle right, and angle codes AC7 to AC9 are preliminarily allocated from the lower left to the lower right. Accordingly, the angle-synthesized frame generating section 134 first assigns the frame corresponded to angle code AC1, to the preliminarily allocated position for angle code AC1 (upper left).

Figure 15:
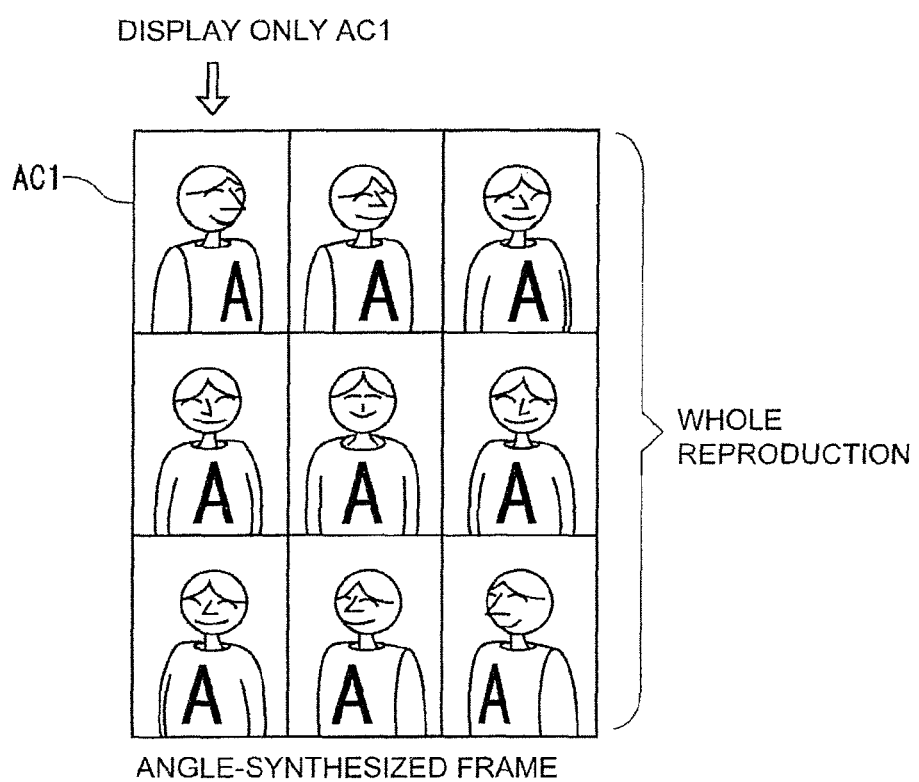
FIG. 15 is an explanatory drawing illustrating an angle-synthesized frame having frame under the same time code and different angle codes arranged in a matrix.

The angle-synthesized frame generating section 134 then repeats the similar process for the frames under the same time code TC1 and the residual angle codes AC2 to AC9, to thereby generate one angle-synthesized frame illustrated in FIG. 15. The angle-synthesized frame is a data having all angle codes AC1 to AC9 under the same time code arranged in a matrix.

Upon generation of the angle-synthesized frame under the same time code, the angle-synthesized frame generating section 134 executes the same process also for the immediate next time code, and furthermore for all time codes. In short, the same number, as the time code, of angle-synthesized frames are generated, and stored in the storage section 15.

Upon completion of generation and storage of all angle-synthesized frames, the angle-synthesized frame generating section 134 outputs a compressed instruction signal to the compression calculating section 135.

Upon receiving the compressed instruction signal, the compression calculating section 135 reads the first angle-synthesized frame from the storage section 15, and compresses it (step S41). That is, the compression calculating section 135 deletes redundant information in the angle-synthesized frame with the first time code, and stores the compressed angle-synthesized frame into the storage section 15. The compression calculating section 135 then sequentially compresses all angle-synthesized frames and stores the results into the storage section 15, and outputs a compression completion signal to the main control section 131a.

Upon receiving the compression completion signal, the main control section 131a reads the output of the operating section 12.

Upon directed for transmission by an user operation on the operating section 12, the operating section 12 outputs a transmission signal. Upon receiving the transmission signal, the main control section 131a extracts the compressed angle-synthesized frame stored in the storage section 15, and sends it through the communication section 14 to the server 3 (step S42).

In this way, the compressed angle-synthesized frame is stored in the server 3.

Next, display operations of the angle-synthesized frame in the display device 2a will be explained, referring to FIG. 16.

Figure 9:
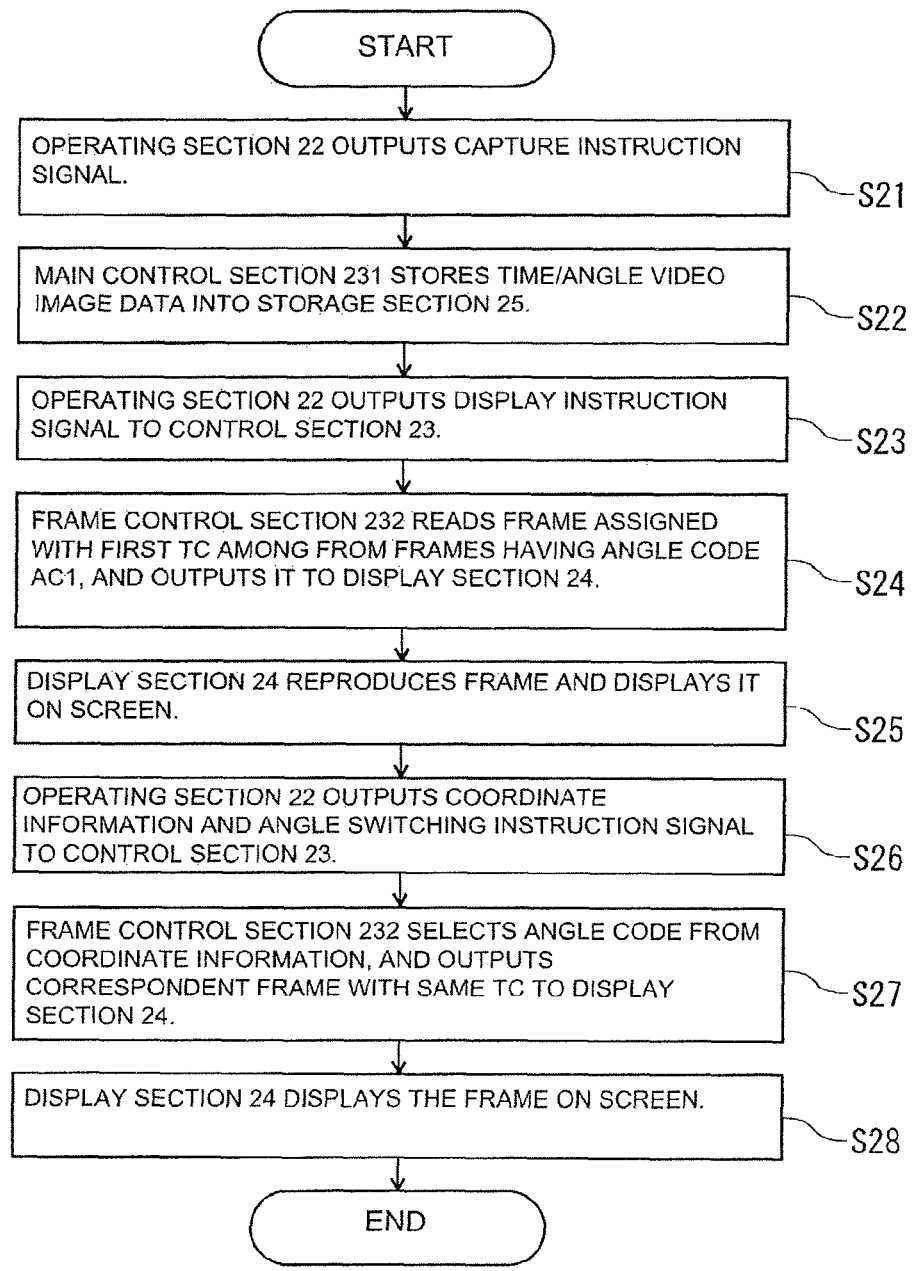
FIG. 9 is a flow chart illustrating operations for displaying video image by the display device shown in FIG. 1.
Figure 16:
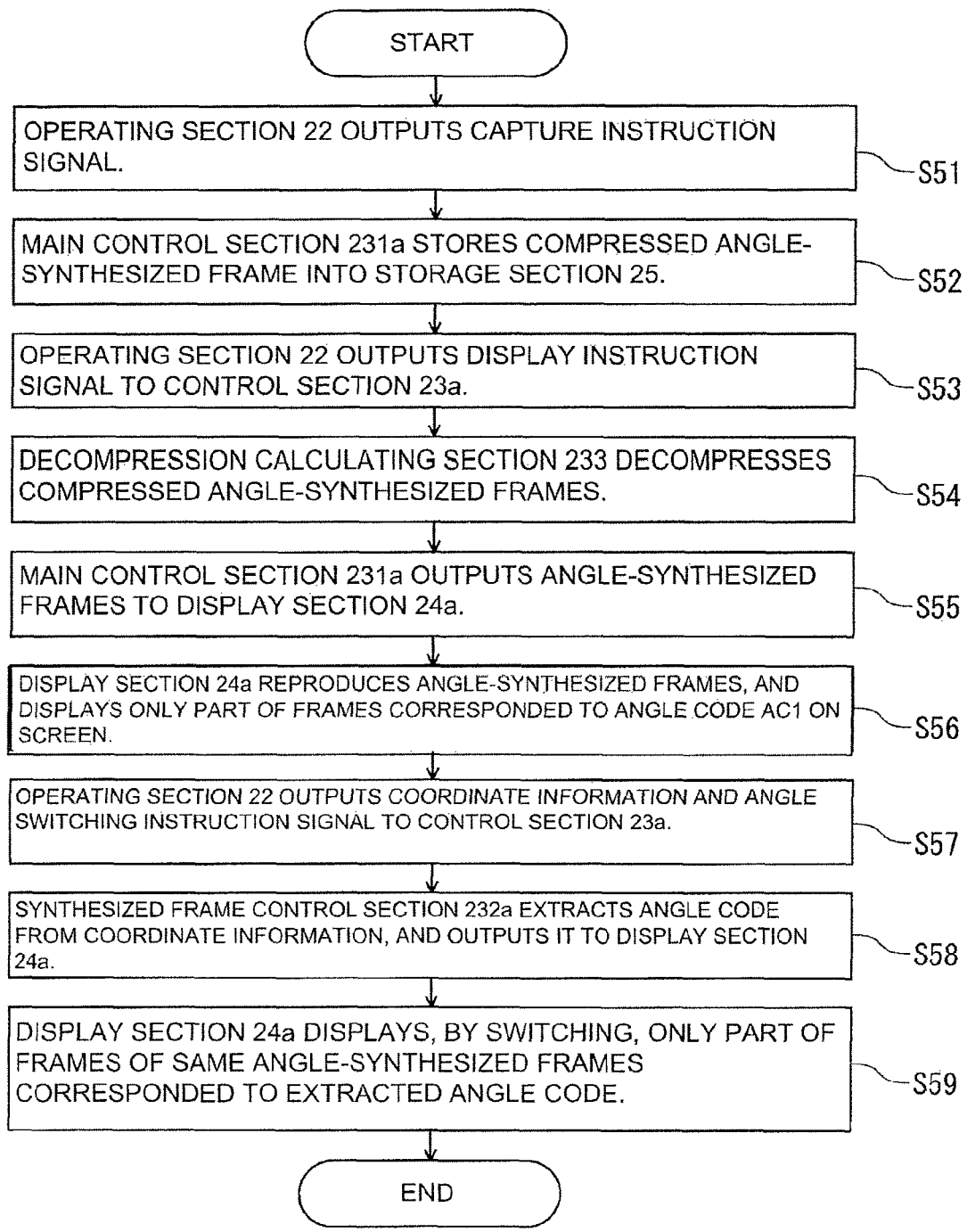
FIG. 16 is a flowchart illustrating operations for displaying video image by the display device shown in FIG. 12.

Note that steps S51 to S53 in FIG. 16 are almost same as steps S21 to S23 in FIG. 9, and will not be explained again.

Now, upon output of a display signal by the operating section 22 to the control section 23a (step S53), the main control section 231a accepts the display signal, and outputs a decompression instruction signal to the decompression calculating section 233. Upon receiving the decompression instruction signal, the decompression calculating section 233 reads the compressed angle-synthesized frame corresponded to the first time code out from the storage section 25, and decompresses it (step S54). The decompression calculating section 233 then stores the decompressed angle-synthesized frame into the storage section 25, and outputs a decompression completion signal to the main control section 231a.

Upon receiving the decompression completion signal, the main control section 231a reads the decompressed angle-synthesized frame, and outputs it to the display section 24a (step S55). The display section 24a reproduces, as illustrated in FIG. 15, the entire angle-synthesized frames, and displays only the upper left frame corresponded to angle code AC1 (step S56).

Then, in the same way, the main control section 231*a* successively outputs the angle-synthesized frames, decompressed by the decompression calculating section 233, in the order of time codes to the display section 24*a*, the display section 24*a* successively reproduces the entire angle-synthesized frames in the order of time codes, and displays only the frames correlated to the same angle code AC1.

Figure 17:
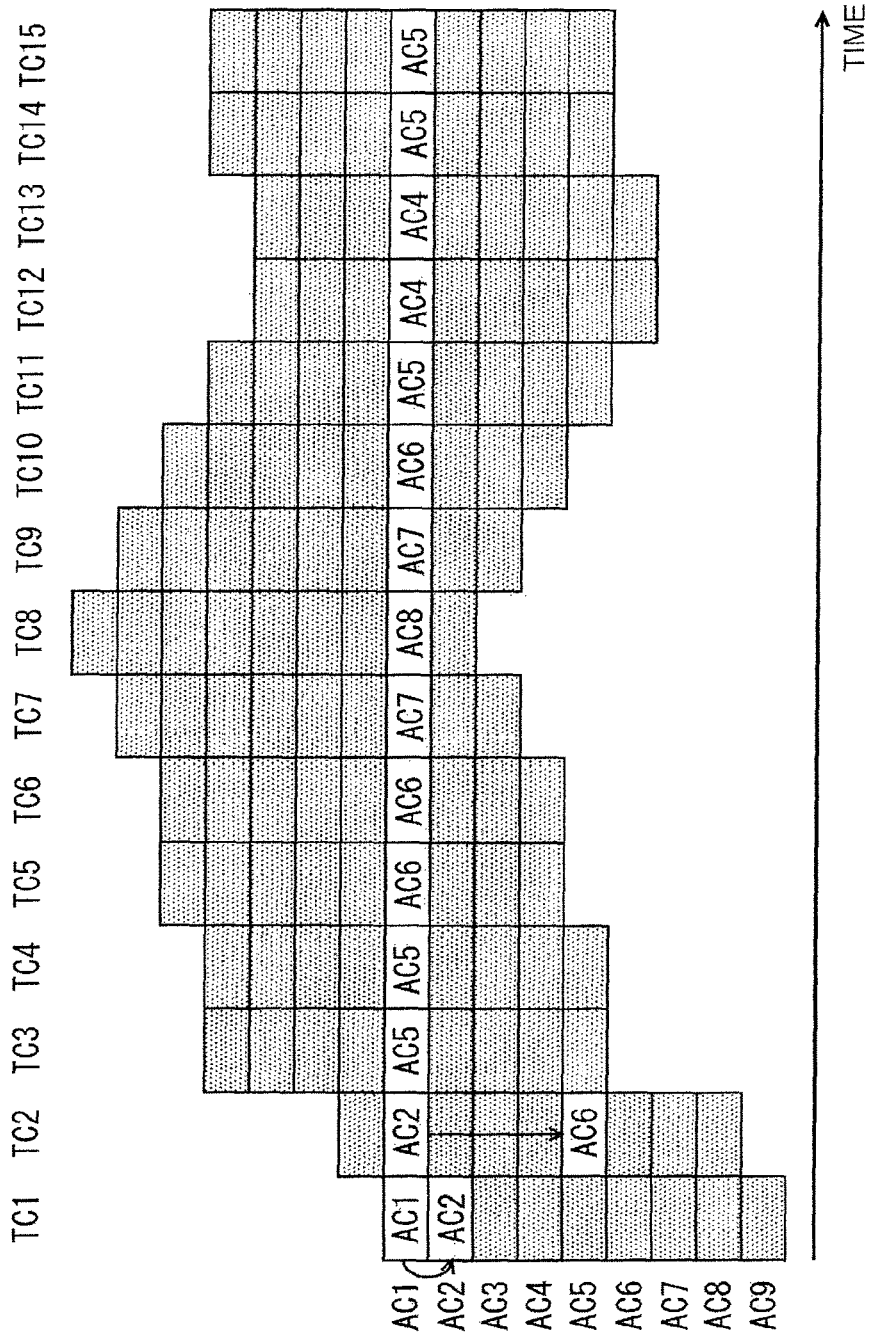
FIG. 17 is an explanatory drawing illustrating a state of frames to be switched during the display of video image by the display device shown in FIG. 12.
Figure 18:
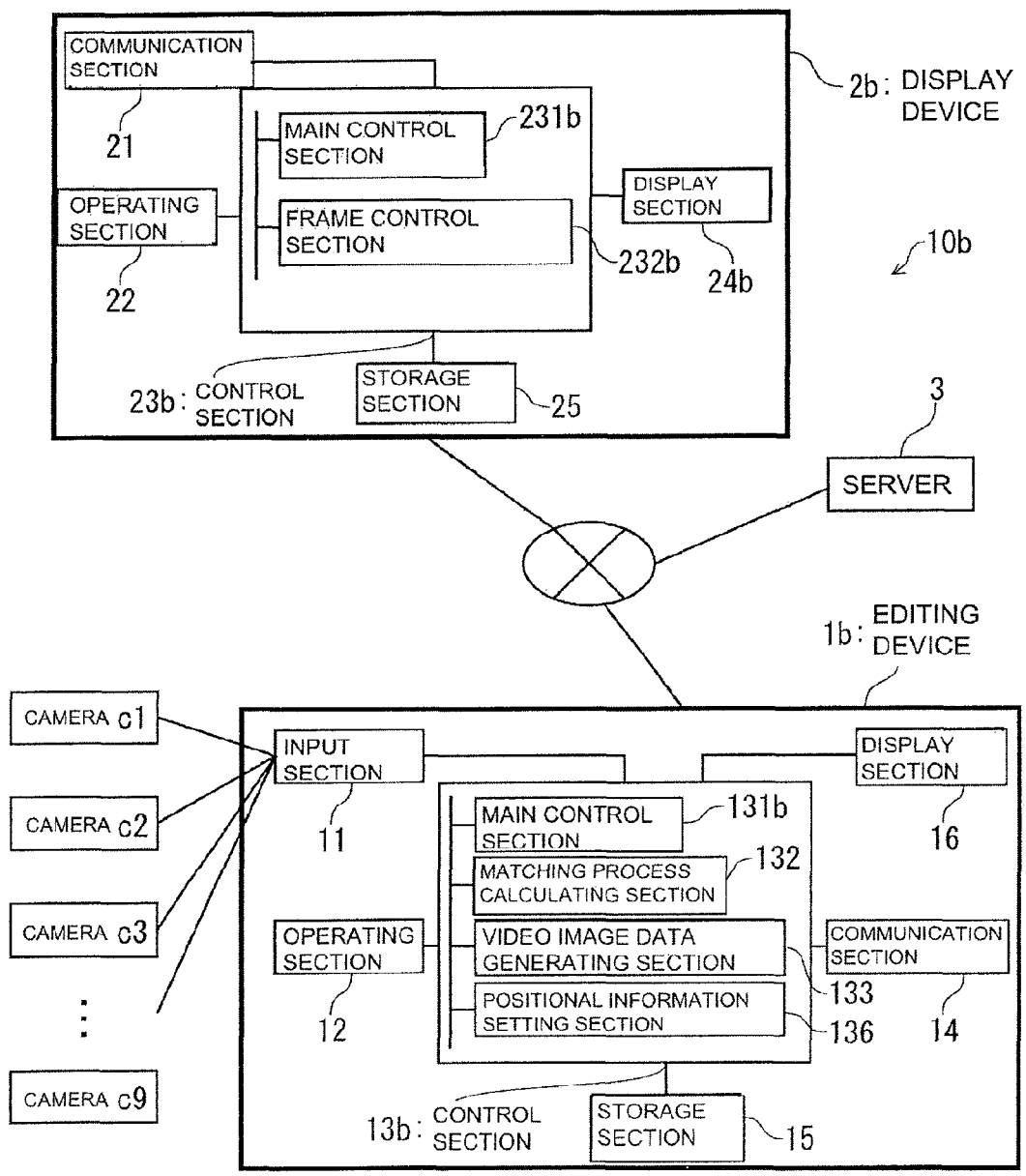
FIG. 18 is an overall configuration diagram illustrating a video image processing/display system in a third embodiment of the present invention.

In this state, upon directed by the user to switch the angle through an operation on the operating section 22, the operating section 22 outputs the coordinate information of the pointer on the screen to the control section 23*a* (step S57). Upon receiving the coordinate information, the main control section 231*a* outputs it to the synthesized frame control section 232*a*. Upon receiving the coordinate information, the synthesized frame control section 232*a* extracts the switched angle code from the coordinate information, and outputs it to the display section 24*a* (step S58). Upon receiving the switched angle code, the display section 24*a* switches the display from the frame currently displayed among from the angle-synthesized frames being reproduced, to the frame corresponded to the switched angle code among from the same angle-synthesized frames (step S59). For example, assuming now that the synthesized frame control section 232*a* displays, as illustrated in FIG. 17, only the frame with angle code AC1, under time code TC1. Note in FIG. 17 that angle codes AC1 to AC9, from the top to the bottom, are respectively assigned to the individual frames for each time code, wherein uncolored frames are being displayed.

Upon directed through the operating section 22 to switch the angle code from AC1 to AC2, the synthesized frame control section 232*a* outputs a switching instruction signal for directing switching to angle code AC2, to the display section 24*a*. Upon receiving the switching instruction signal which directs switching within the display period of a single frame at 30 fps, the display section 24*a* switches the display to the frame with angle code AC2 among from the angle-synthesized frames being reproduced. On the other hand, while the frame with angle code AC2 is displayed under time code TC2, and upon directed by the user to switch the angle through cursor movement from AC2 to AC6 across the adjacent angle code within the display period of a single frame at 30 fps, the synthesized frame control section 232*a* outputs the angle switching instruction signal to the display section 24*a*. The display section 24*a* sequentially displays, among from the angle-synthesized frames being displayed, the frames with the adjacent angle codes, such as from angle code AC2 to AC3, AC4, AC5 and AC6. In this way, as illustrated in FIG. 11, upon directed to switch the angle across the adjacent angle code under the same time code, within the display period of a single frame at 30 fps, the frame with the adjacent angle code up to the frame with the angle code directed to be switched, including all frames in between, under the same time code, are displayed on the display section 24*a* in a sequential and successive manner.

As described above, according to the display device 2*a*, the video image display method, the program and the video image processing/display system 10*a* of this embodiment, the synthesized frame control section 232*a* reads the angle-synthesized frame in a frame-by-frame manner, the display section 24*a* reproduces the angle-synthesized frames in a frame-by-frame manner, and displays only a predetermined frame, thereby the angle-switching display may be implemented in a more swift manner.

Since the angle-synthesized frame generating section 134 generates the angle-synthesized frame, so that the display device 2 is allowed to implement the angle-switching display in a more swift manner.

Since the compression calculating section 135 compresses the angle-synthesized frame, so that the time/angle video image data may be reduced in volume, and thereby the individual devices may be reduced in load.

Embodiment 3

Next, a third embodiment of the present invention will be explained.

FIG. 18 to FIG. 21 illustrate the third embodiment of the present invention.

In FIG. 18 to FIG. 21, all constituents identical to those shown in FIG. 1 to FIG. 11 will be given the same symbols, and explanations therefor will not be repeated.

Basic configuration of this embodiment is same as that of the first embodiment, so that the description below will mainly deal with different aspects.

A video image processing/display system 10*b* has an editing device (video image processing device) 1*b*, a display device (video image display device) 2*b* and the server 3. The editing device 1*b* and the display device 2*b* and the server 3 are connected through a network.

The editing device 1*b* has a control section 13*b* which controls the entire device. The editing device 1*b* has the input section 11, the operating section 12, the communication section 14, the storage section 15, and the display section 16.

The control section 13*b* has a main control section 131*b*, and a positional information setting section 136 which sets positional information of the cameras c1 to c9. The control section 13*b* has the matching process calculating section 132, and the video image data generating section 133.

The main control section 131*b* controls the entire control section 13*b*.

The positional information setting section 136 calculates positional information of the cameras c1 to c9, correlates the positional information to each angle code, and stores them into the storage section 15. A method of calculating the positional information is arbitrarily selectable. For example, the positional information may be calculated based on a predetermined function using a predetermined parameter which is input by the user through the operating section 12, or the coordinate information of the cameras c1 to c9, which is input by the user through an operation on the operating section 12, may be set directly as the positional information.

The display device 2*b* has a control section 23*b* which controls the entire device, and a display section (display unit) 24*b* on which the video image is displayed. The display device 2*b* also has the communication section 21, the operating section 22, and the storage section 25.

The display section 24*b* is typically composed of a monitor, and displays the video image such as the time/angle video image data stored in the storage section 25.

The control section 23*b* has a main control section 231*b*, and a frame control section (read-out unit, shift information calculating unit) 232*b* which controls the output of the time/angle video image data.

The main control section 231*b* controls the entire control section 23*b*.

The frame control section 232*b* reads the frame based on the time code and the angle code, and outputs it to the display section 24*b*. The frame control section 232*b* also controls angle switching, using the positional information stored in the storage section 25.

Next, operations of the thus-configured video image processing/display system 10*b* in the third embodiment will be explained.

Note that the setting of the cameras and the reference object, and pre-process operations including the matching process are same as described above in the first embodiment, and will not be explained again.

Paragraphs below will explain operations of the editing device 1b in the actual shooting of the object, referring to FIG. 19.

Figure 19:
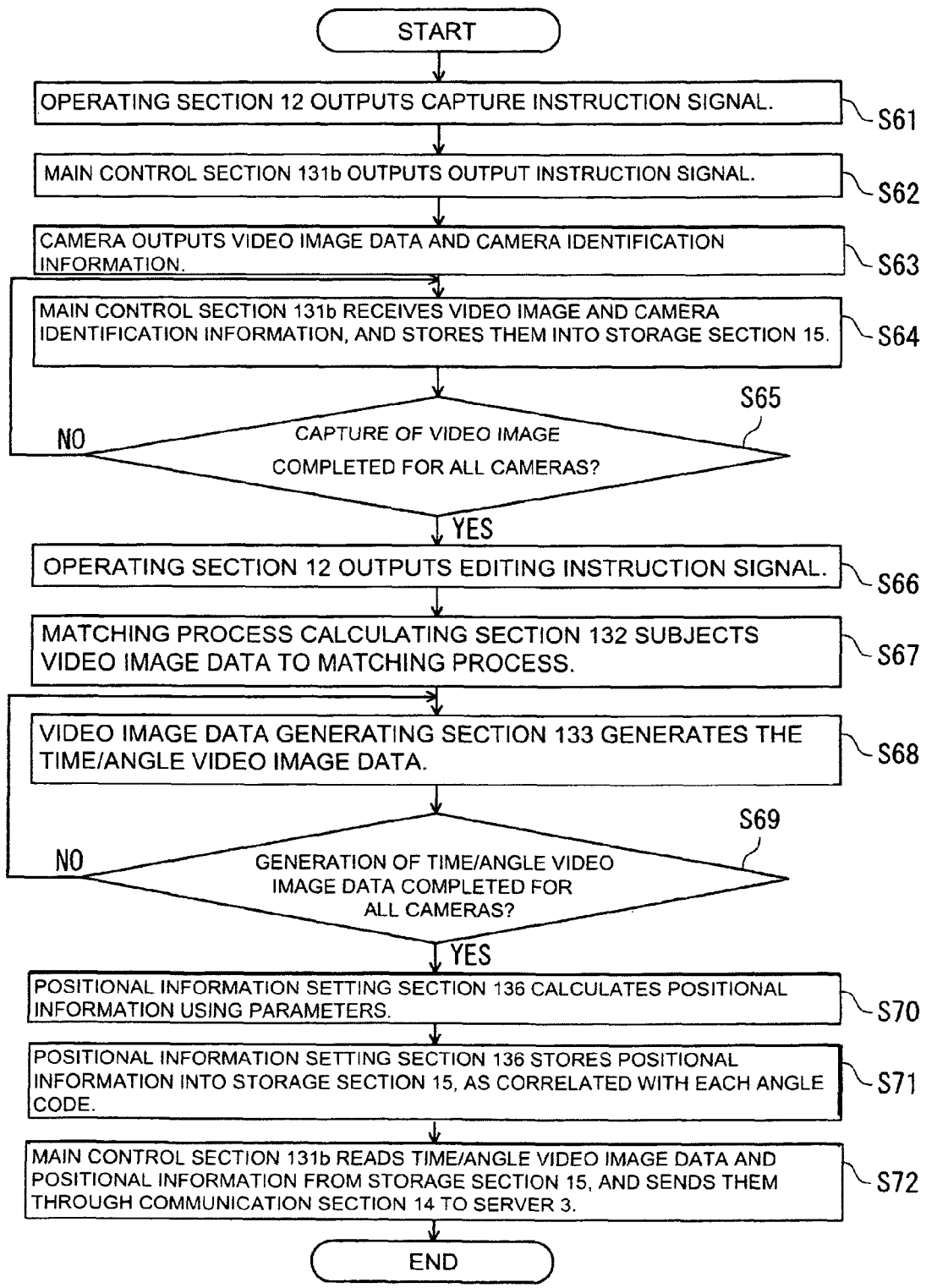
FIG. 19 is a flow chart illustrating post-shooting editing operations by an editing device shown in FIG. 18.

Operations in steps S61 to S69 in FIG. 19 are same as those in steps S1 to S13 in FIG. 8, and will not be explained again.

Now, upon determined that the generation of the time/angle video image data has completed (step S69: YES), the main control section 131b reads the output of the operating section 12.

Figure 20:
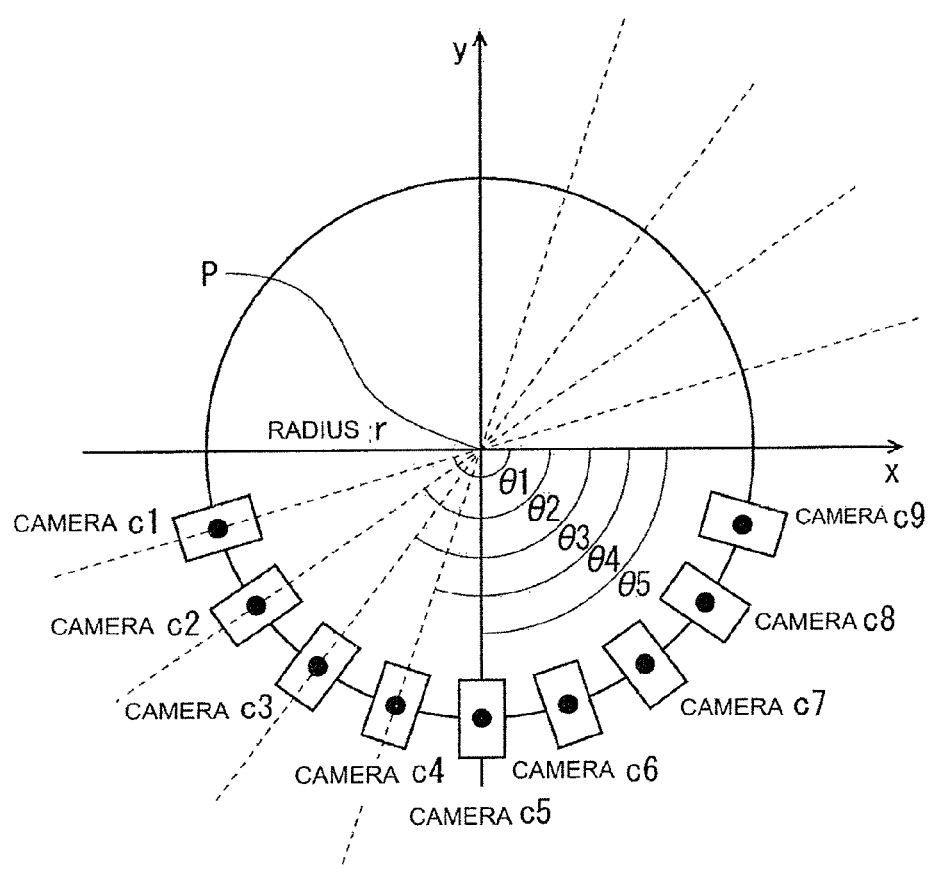
FIG. 20 is an explanatory drawing illustrating a scheme of calculating positional information of cameras.

Upon input of parameters relevant to the positional information by the user through an operation on the operating section 12, the main control section 131b accepts the parameters output from the operating section 12, stores them into the storage section 15, and outputs a positional information setting instruction signal to the positional information setting section 136. Upon receiving the positional information setting instruction signal, the positional information setting section 136 reads the parameters from the storage section 15, and calculates the positional information of the cameras c1 to c9 (step S70). The positional information may be calculated typically as described below. As illustrated in FIG. 20, there are two parameters, which are the radius r of a circle on which the cameras c1 to c9 are arranged, and the setting angle θ of the cameras away from the x-axis in the positive direction. Upon receiving the radius r and the angle θ as the parameters, the positional information setting section 136 first calculates the positional information of the camera c1.

The coordinates of the cameras is given by the equations below:

Coordinates (x,y) of camera=(r cos θ, −r sin θ)
Given a radius of 1 m,
an angle θ1 of camera c1 of 162°,
an angle θ2 of camera c2 of 144°,
an angle θ of camera c3 of 126°,
an angle θ of camera c4 of 108°, and
an angle θ of camera c5 of 90°,
then,
coordinates (x,y) of camera c1≈(−0.95, −0.31),
coordinates (x,y) of camera c2≈(−0.81, −0.59),
coordinates (x,y) of camera c3≈(−0.59, −0.81),
coordinates (x,y) of camera c4≈(−0.31, −0.95), and
coordinates (x,y) of camera c5≈(0.00, −1.00).

The positional information setting section 136 respectively correlates these coordinates as the positional information with each angle code, and stores them into the storage section 15 (step S71).

Upon reading the sending instruction signal output by the operating section 12, as directed by the instruction sent by the user, the main control section 131b reads the time/angle video image data and the positional information of the cameras c1 to c9 out from the storage section 15, and then send them through the communication section 14 to the server 3 (step S72).

In this way, the time/angle video image data and the positional information are stored into the server 3.

Next, operations for displaying the time/angle video image data on the display device 2b will be explained, referring to FIG. 21.

Figure 21:
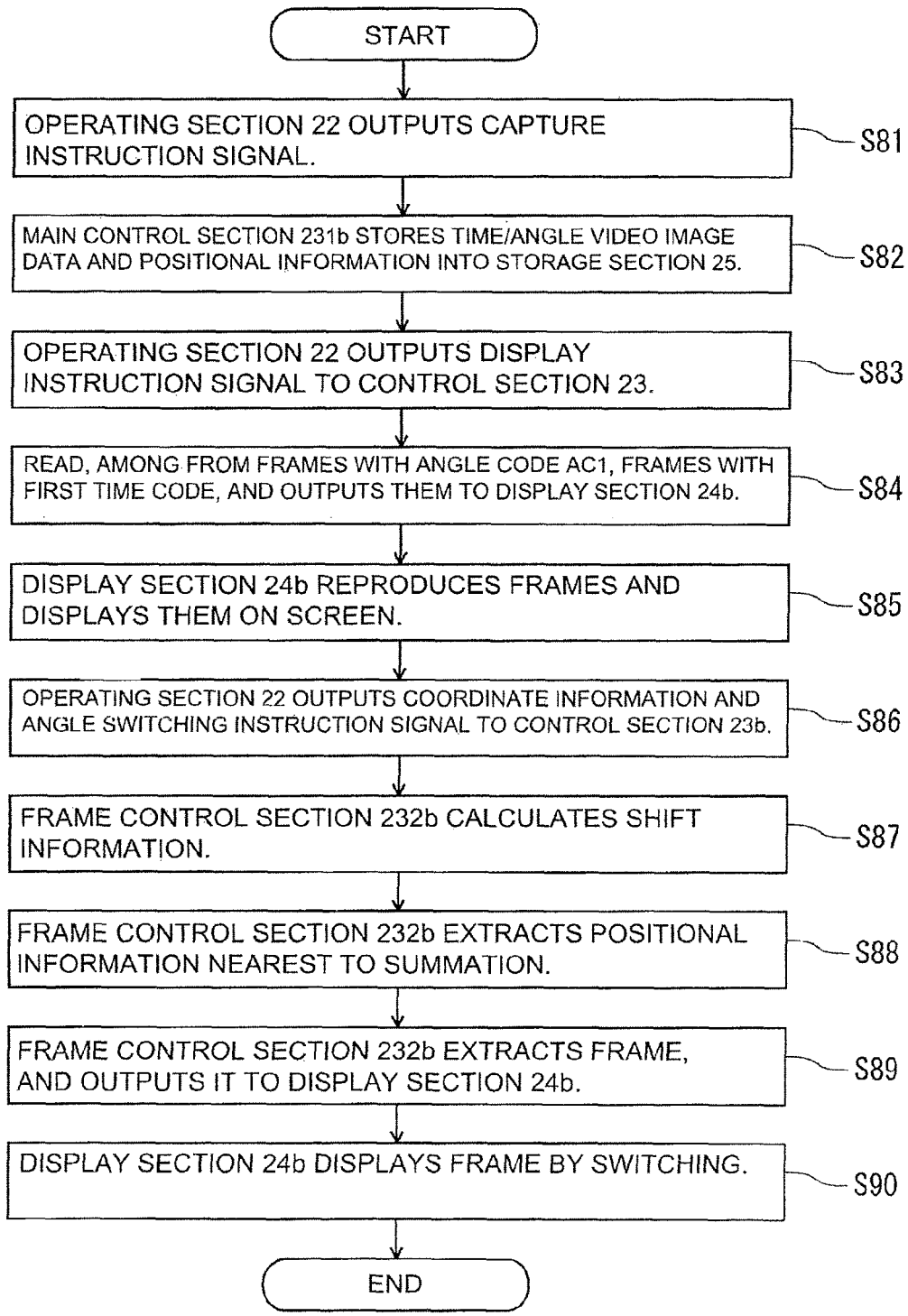
FIG. 21 is a flowchart illustrating operations for displaying video image by the display device shown in FIG. 18.

Note that steps S81 to S86 in FIG. 21 are almost same as steps S21 to S26 in FIG. 9, and will not be explained again.

Now, the display section 24b is assumed to display the video image of the camera c1.

Upon output of the coordinate information from the operating section 22 to the control section 23b (step S86), the main control section 231b accepts the coordinate information, and outputs it to the frame control section 232b. Upon receiving the coordinate information, the frame control section 232b calculates the shift information of the pointer (step S87). That is, the frame control section 232b calculates the shift information by extracting the coordinates of the start point of the pointer and the coordinates after shifting, calculating the difference in the transverse direction, and multiplying the difference by a predetermined coefficient. In this process, the frame control section 232b divides the entire range of shift of the pointer from the start point to the end point, into segments each having a range shorter than the entire range of shift, and calculates the shift information every time the segment advances. That is, over the entire range of shift of the pointer from the start point to the end point, the frame control section 232b successively calculates a plurality of shift information for every segment.

Suppose now, for example, that the user moves the mouse rightward, to thereby continuously shift the pointer from the start point (0,0) to (100,0) (a 5-cm rightward shift on the screen). First, the frame control section 232b calculates, as a 1-point-long segment, a difference of 1 between the start point (0,0) and a transversely adjacent point (1,0), and multiplies it by coefficient 0.005, to thereby calculate the shift information 0.005.

The frame control section 232b further adds +0.005 (representing a 0.5-cm rightward shift of camera position), to the x-coordinate of the positional information (−0.95, −0.31) of the camera c1. That is, the summation gives −0.95+0.005=−0.945. The frame control section 232b then extracts the positional information which has the x-coordinate nearest to the sum −0.945 (step S88). For example, the camera c1 gives a difference of 0.005 between the sum −0.945 and the x-coordinate thereof, whereas the camera c2 gives a difference of 0.135 (0.945-0.81). The camera c1, having an x-coordinate of −0.95, is therefore found to be nearest to the sum −0.945. The frame control section 232b further repeats the same process every time the pointer advances by one point. The 14th process will give a sum of 0.95−(0.005×14)=0.88, a distance from the camera c1 of 0.95−0.88=0.07, and a distance from the camera c2 of 0.88−0.81=0.07, indicating the same distance to the camera c1 and to the camera c2. If the distances are equal, the frame control section 232b keeps the angle code of the camera c1 without switching. The successive 15th process will give a sum of 0.95−(0.005×15)=0.875, a distance from the camera c1 of 0.95−0.875=0.075, and a distance from the camera c2 of 0.875−0.81=0.065, indicating that the camera c2 is nearer. Accordingly, frame control section 232b extracts the frame with angle code AC2 under the same time code, from the positional information of the camera c2, and outputs it to the display section 24b (step S89).

The display section 24b then displays the frame with angle code AC2, as switched from the frame with angle code AC1 (step S90). That is, over the period where the pointer continuously moves rightward by 5 cm, the frame control section 232b checks the positional information of the camera at 0.5-cm intervals, for every 1-point shift of the pointer, and the display section 24b switches to the frame of the adjacent camera, every time the positional information is switched. More specifically, as illustrated in FIG. 11, the frames of the cameras arranged on the way of the 5-cm shift of the pointer are displayed while being successively switched, rather than that the display jumps from the currently-displayed frame to the frame after the 5-cm shift of the pointer. The display device 2*b* repeats the processes of steps S86 to S90, until the pointer shifts rightward by 5 cm to reach coordinates (100,0).

As described above, according to the display device 2*b*, the video image display method, the program and the video image processing/display system 10*b* of this embodiment, the frame control section 232*b* extracts the frame based on the shift information of the pointer and the positional information of the cameras, so that the display with switched angles may be implemented more naturally, corresponding to the setting position of the cameras c1 to c9.

Since the positional information setting section 136 calculates the positional information of the cameras c1 to c9, so that the display with switched angles may be implemented more naturally on the display device 2*b*, corresponding to the setting position of the cameras c1 to c9.

Embodiment 4

Next, a fourth embodiment of the present invention will be explained.

Figure 22:
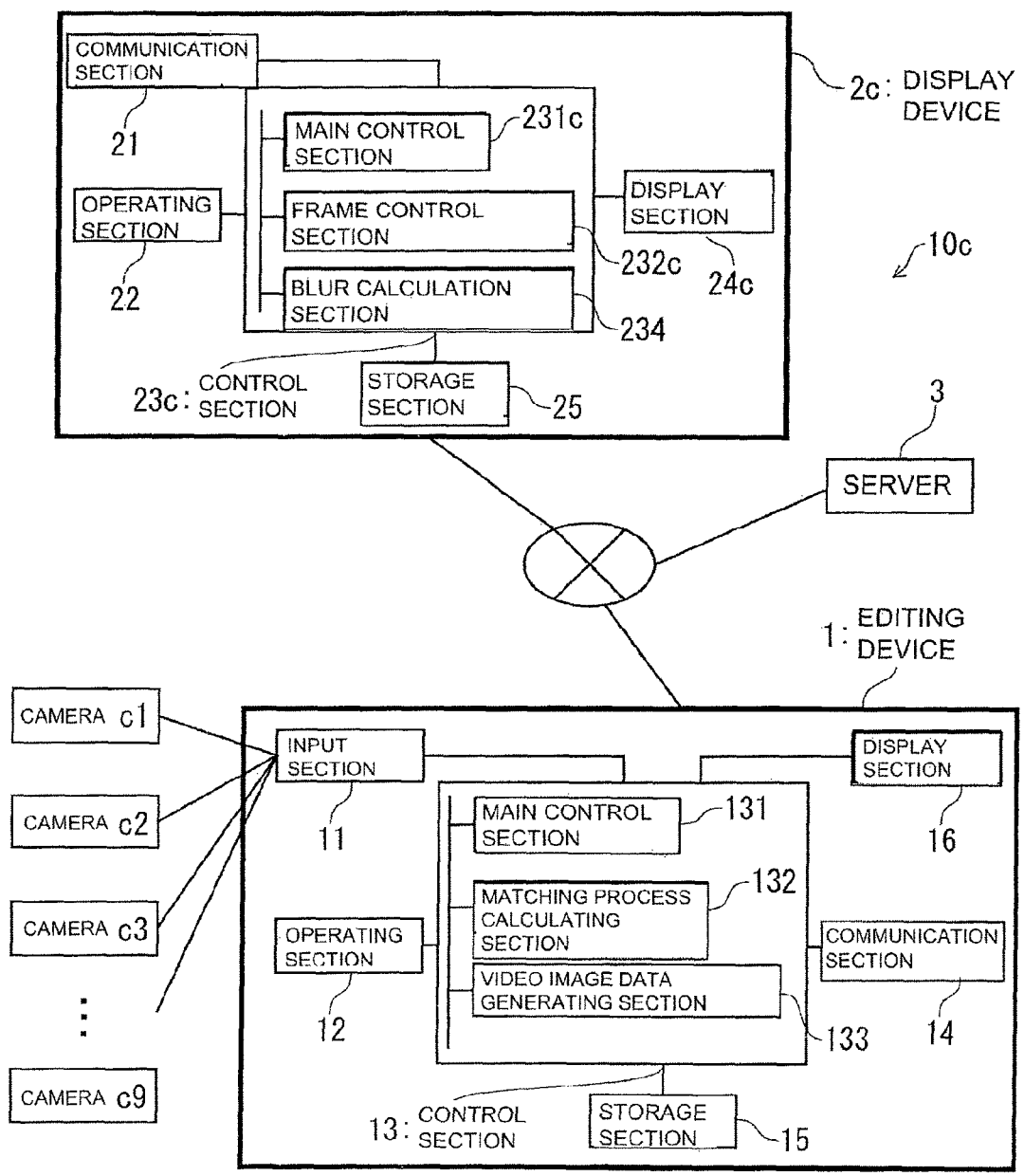
FIG. 22 is an overall configuration diagram illustrating a video image processing/display system in a fourth embodiment of the present invention.
Figure 23:
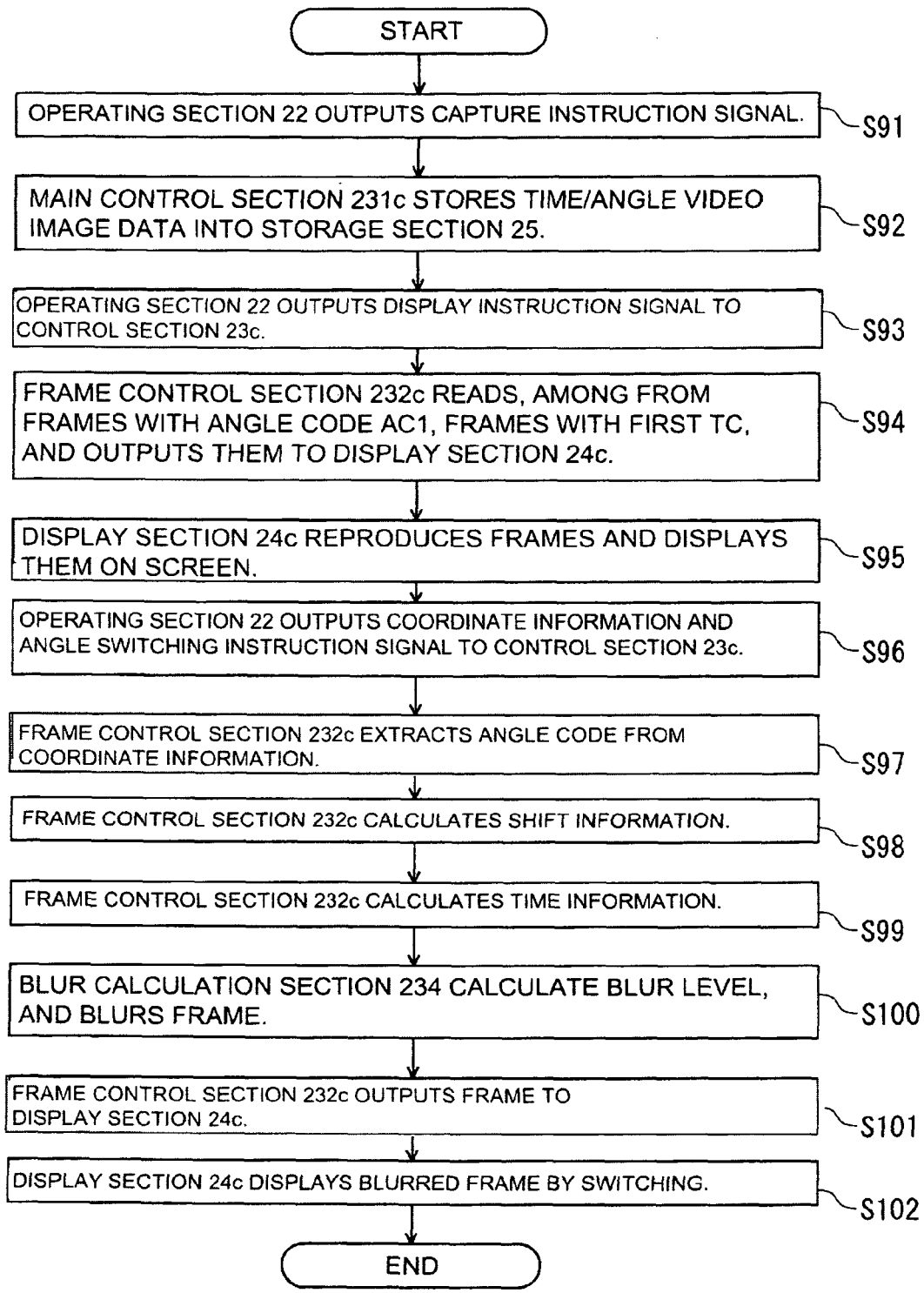
FIG. 23 is a flow chart illustrating operations for displaying video image by the display device shown in FIG. 22.

FIG. 22 to FIG. 24 are drawings illustrating the fourth embodiment of the present invention.

In FIG. 22 to FIG. 24, all constituents identical to those shown in FIG. 1 to FIG. 11 will be given the same symbols, and explanations therefor will not be repeated.

Basic configuration of this embodiment is same as that of the first embodiment, so that the description below will mainly deal with different aspects.

A video image processing/display system 10*c* has the editing device (video image processing device) 1, a display device (video image display device) 2*c*, and the server 3. The editing device 1, the display device 2*c*, and the server 3 are connected through a network.

The editing device 1 is same as the editing device 1 described above in the first embodiment, and will not be explained again.

The display device 2*c* has a control section 23*c* which controls the entire device, and a display section (display unit) 24*c* on which the video image is displayed. The display device 2*c* also has the communication section 21, the operating section 22, and the storage section 25.

The display section 24*c* is typically composed of a monitor, and displays the video image such as the time/angle video image data stored in the storage section 25.

The control section 23*c* has a main control section 231*c*, a frame control section (read-out unit) 232*c* which controls output of the time/angle video image data, and a blur calculation section (blurring unit) 234 which blurs the frame.

The main control section 231*c* controls the entire control section 23*c*.

The frame control section 232*c* reads the frame, based on the time code and the angle code, and outputs it to the display section 24*c*. The frame control section 232*c* also reads the frame blurred by the blur calculation section 234 out from the storage section 25, and outputs it to the display section 24*c*.

Upon receiving a blurring signal output from the main control section 231*c*, the blur calculation section 234 extracts a frame out from the storage section 25, and implements blurring corresponding to the length of time and the range of shift of the pointer on the screen issued through the operating section 22.

Next, operations of the thus-configured video image processing/display system 10*c* in the fourth embodiment will be explained.

Note that the setting of the cameras and the reference object, pre-process operations including the matching process and the editing operations by the editing device 1 are same as described above in the first embodiment, and will not be explained again.

Paragraphs below will explain operations for displaying the time/angle video image data on the display device 2*c*, referring to FIG. 23.

Operations in steps S91 to S96 in FIG. 23 are same as those in steps S21 to S26 in FIG. 9, and will not be explained again.

Suppose now that the display section 24*c* displays the video image data of the camera c1.

Upon output of the coordinate information by the operating section 22 (step S96), the main control section 231*c* accepts the coordinate information, and outputs it to the frame control section 232*c*.

Upon receiving the coordinate information, the frame control section 232*c* stores the time of acceptance and the coordinate information into the storage section 25, and extracts the angle code among from the coordinate information. That is, similarly as in step S27 in the first embodiment (shown in FIG. 9), the frame control section 232*c* extracts the angle code among from the coordinate information of the pointer (step S97). Upon determined that the angle code has been switched, the frame control section 232*c* calculates the shift information of the pointer (step S98), and stores it into the storage section 25. For example, the frame control section 232*c* calculates the shift information by extracting the coordinates of the start point of the pointer and the coordinates after shifting, and finding the difference in the transverse direction. In this process, the frame control section 232*c* divides the entire range of shift of the pointer from the start point to the end point, into small switching segments each time the angle code switches to the adjacent one, and calculates the shift information every time the switching segment advances. That is, over the entire range of shift of the pointer from the start point to the end point, the frame control section 232*c* successively calculates a plurality of shift information for every switching segment.

The frame control section 232*c* calculates the time information of the pointer (step S99), and stores it into the storage section 25. Also in this process, the frame control section 232*c* successively calculates a plurality of time information for every switching segment, over the entire range of shift of the pointer from the start point to the end point.

Suppose now, for example, that the user moves the mouse rightward, to thereby continuously shift the pointer from the start point (0,0) to (100,0) (a 5-cm rightward shift on the screen). First, the frame control section 232*c* extracts, as a 1-point-long segment, the angle code correlated to point (1,0) transversely adjacent to the start point (0,0). The angle code herein is AC1, which indicates no change. The frame control section 232*c* repeats step S97 for every point, and when the pointer reached the coordinates of point (20,0), switches the angle code to be extracted to AC2. Upon determined that the angle code has been switched, the frame control section 232*c* then calculates the difference, that is 20 points, in the transverse direction between the start point (0,0) and point (20,0) to generate the shift information. The frame control section 232*c* further calculates the difference, that is 0.2 seconds, between the time of acceptance at the start point (0,0) and the time of switching when the angle code is switched, to generate the time information.

Upon completion of calculation of the shift information and the time information, the frame control section 232*c* outputs the time code, the angle code and the completion signal at the time the frame is switched to the main control section 231*c*. Upon receiving the time code, the angle code and the completion signal, the main control section 231*c* outputs the time code, the angle code and the blurring signal to the blur calculation section 234.

Upon receiving the time code, the angle code and the blurring signal, the blur calculation section 234 blurs a frame corresponded to the time code and the angle code (step S100). That is, the blur calculation section 234 reads the shift information (20 points) and the time information (0.2 seconds) stored in the storage section 25, and calculates a blur level corresponded to the shift information and the time information. For example, as illustrated in FIG. 24, the blur calculation section 234 extracts level 11 from the shift information-time information correlation table, based on the shift information 20 (20 to 39 points) and the time information 0.2.

The blur calculation section 234 blurs the frame to be extracted at level 11, and outputs the result to the frame control section 232c. The frame control section 232c outputs the frame to the display section 24c (step S101). These operations are repeated until the pointer stops.

The display section 24c displays, by switching, the blurred frame output from the frame control section 232c (step S102).

The blur level becomes larger and the display becomes more strongly blurred, as the pointer increases in the shift information and decreases in the time information, meanwhile the blur level becomes smaller and the display becomes more weakly blurred, as the pointer decreases in the shift information and increases in the time information. It is understood now that the shift information of the pointer means the magnitude of switching level, and the time information of the pointer means length of the switching time.

For the last frame corresponded to the endpoint in the entire range of shift of the pointer, the blur calculation section 234 outputs the blurred frame and the completion signal to the frame control section 232c, and for the frame with the next time code and thereafter, the frame control section 232c reads the frame out from the storage section 25, and displays it to the display section 24c without blurring.

As described above, according to the display device 2c, the video image display method, the program and the video image processing/display system 10c of this embodiment, the blur calculation section 234 blurs a predetermined frame, and the display section 24c displays the blurred frame, so that the presence given by angle shifting may be enhanced.

Also since the blur calculation section 234 calculates the level of blurring based on the shift information and the time information of the pointer, so that the level of blurring is variable depending on the length of time and the range of shift of the pointer moved by the user, and thereby the presence is further enhanced.

Embodiment 5

Next, a fifth embodiment of the present invention will be explained.

Figure 26:
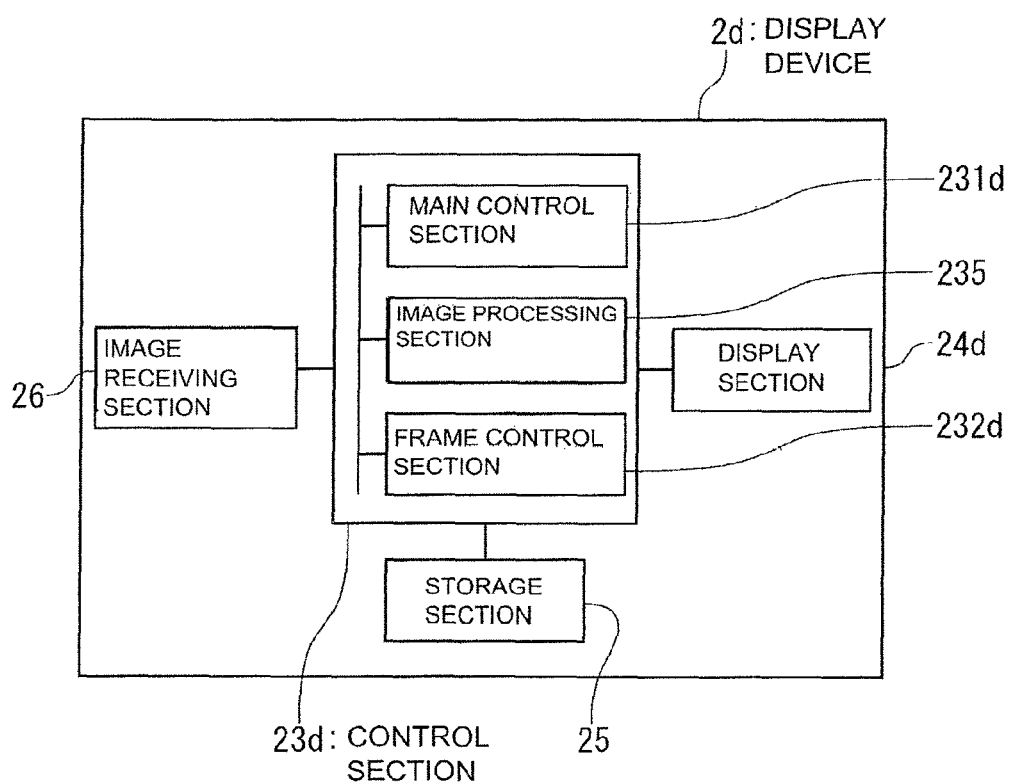
FIG. 26 is a configuration diagram illustrating a video image display device in a fifth embodiment of the present invention.
Figure 27:
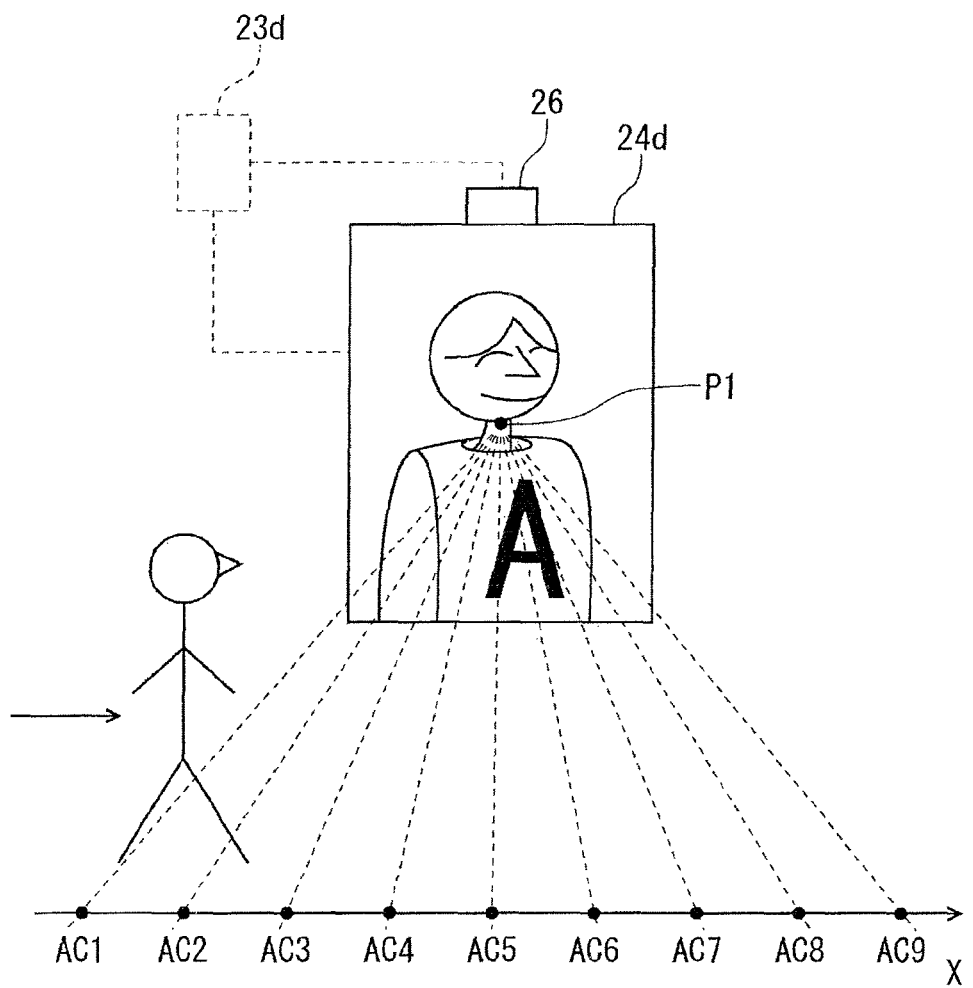
FIG. 27 is an explanatory drawing illustrating the video image display device shown in FIG. 26 and movement of a viewer in a instruction spatial coordinate system.
Figure 28:
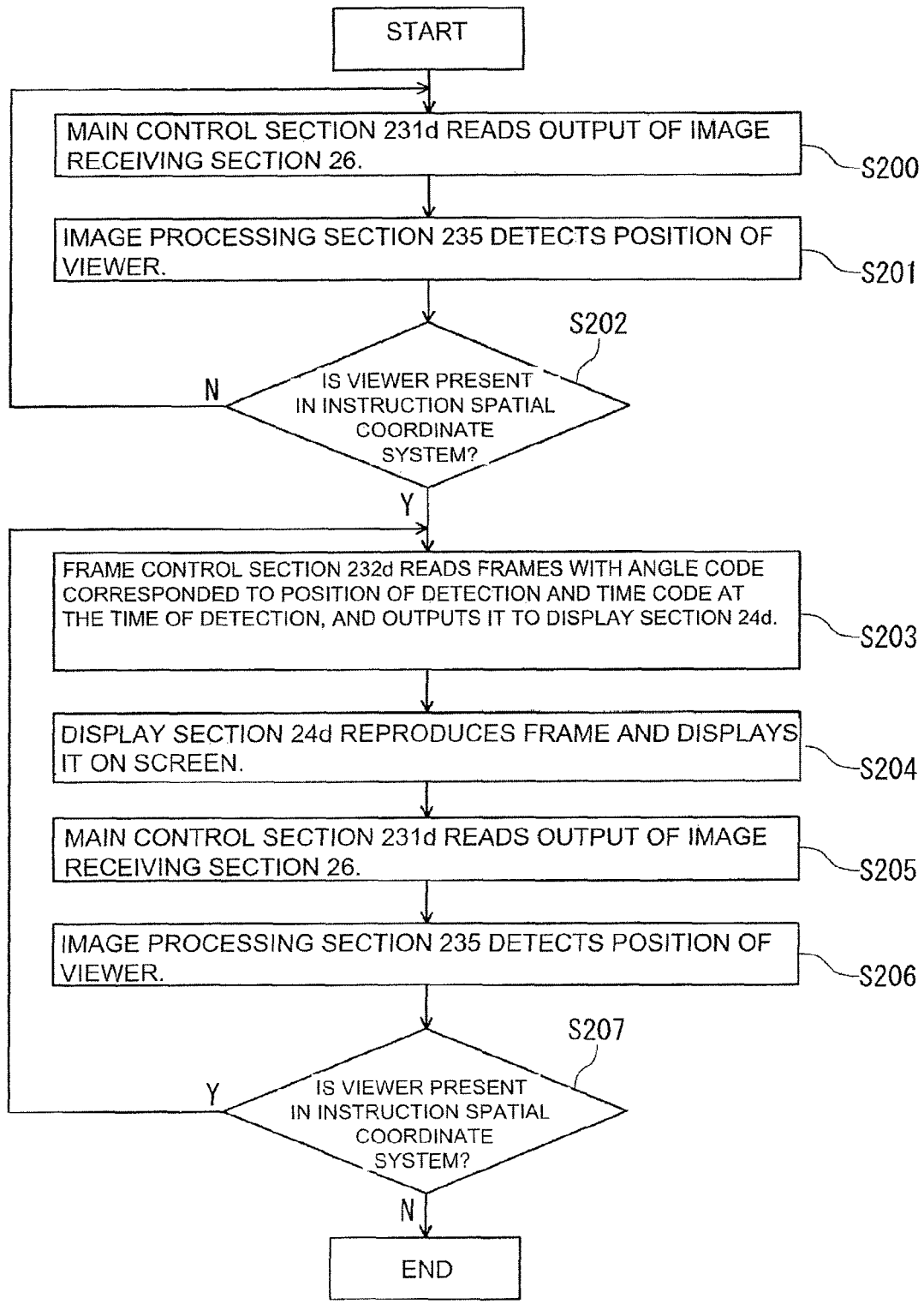
FIG. 28 is a flow chart illustrating operations for displaying video image by the display device shown in FIG. 26.
Figure 29:
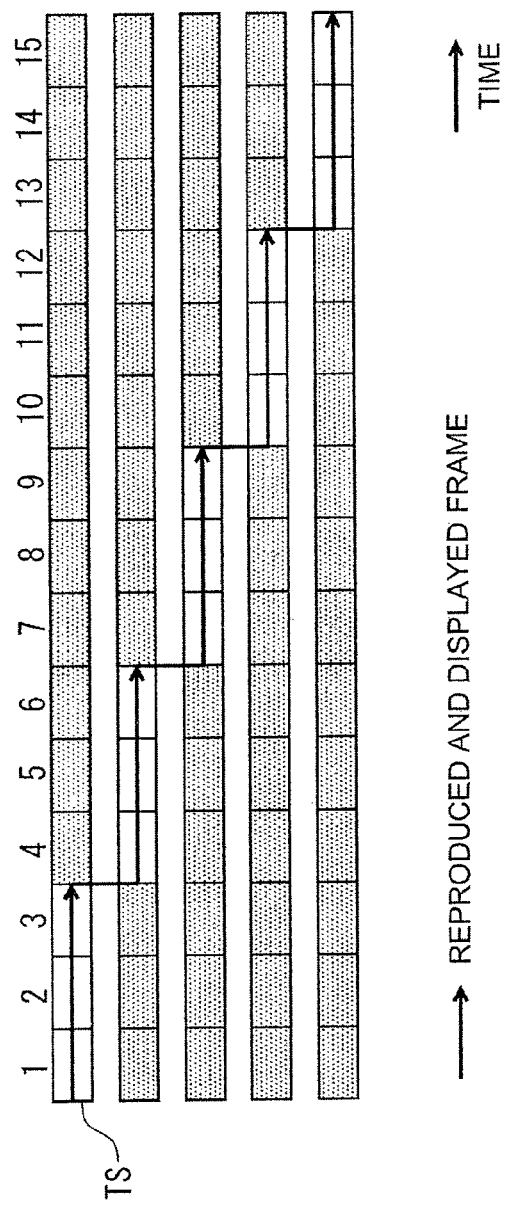
FIG. 29 is an explanatory drawing illustrating a state of frames to be switched by a conventional display device.
Figure 30:
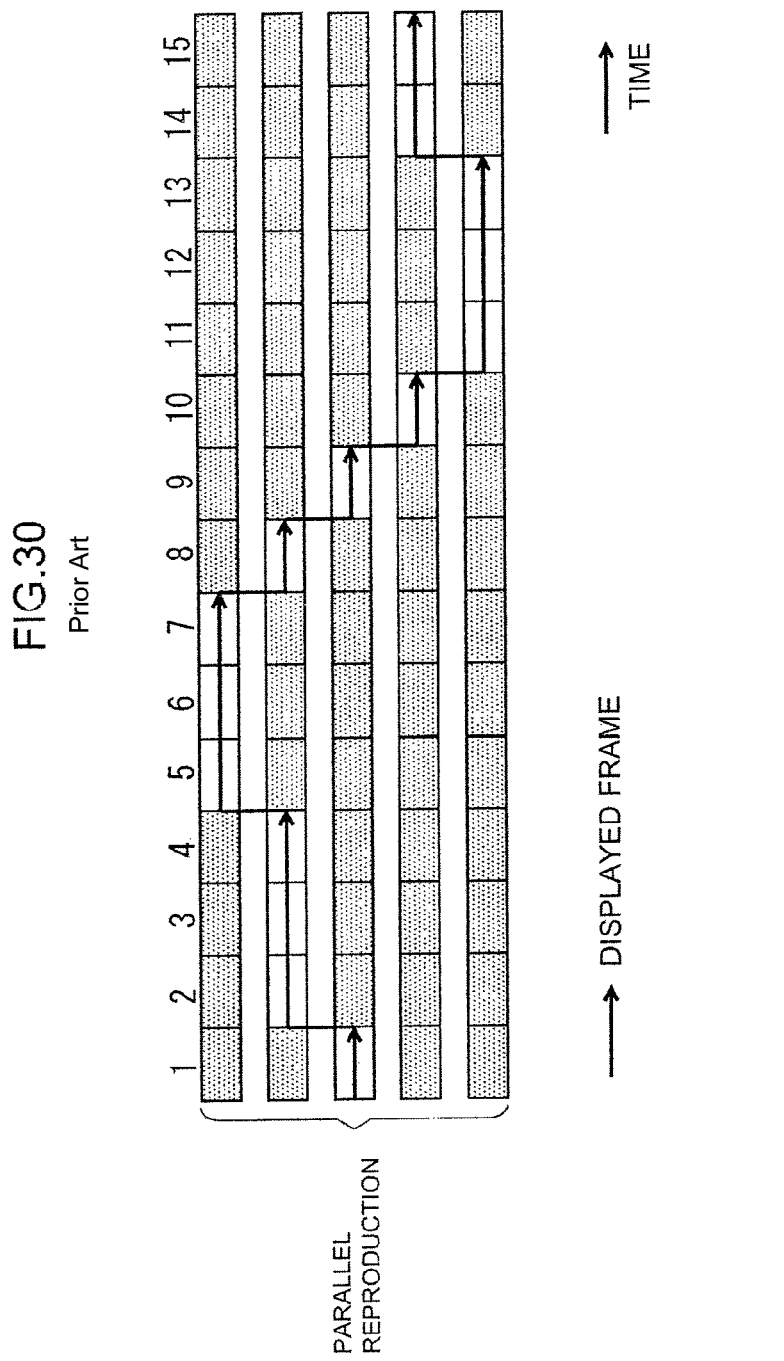
FIG. 30 is an explanatory drawing illustrating a state of frames to be switched by another conventional display device.

FIG. 26 to FIG. 28 are drawings illustrating the fifth embodiment of the present invention.

In FIG. 26 to FIG. 28, all constituents identical to those shown in FIG. 1 to FIG. 11 will be given the same symbols, and explanations therefor will not be repeated.

Basic configuration of this embodiment is same as that of the first embodiment, so that the description below will mainly deal with different aspects.

A display device (video image display device) 2d is typically used for displaying advertisement installed on the street, such as digital signage.

The display device 2d has a control section 23d which controls the entire device, the storage section 25, a display section (display unit) 24d on which the video image is displayed, and an image receiving section (instruction input unit) 26 which captures image of a predetermined space.

The display section 24d is typically composed of a monitor such as liquid crystal display or organic EL display, and displays the video image such as the time/angle video image data stored in the storage section 25.

The storage section 25 stores the time/angle video image data for advertisement.

The image receiving section 26 is typically composed of a camera, and installed on the upper edge of the display section 24d. The image receiving section 26 captures a predetermined space ahead of the display section 24d, and generates imaging data.

The control section 23d has a main control section 231d, a frame control section (read-out unit) 232d which controls the output of the time/angle video image data, and an image processing section (detection unit) 235 which detects human motion through image processing.

The main control section 231d controls the entire control section 23d.

The frame control section 232d reads the frame out from the storage section 25 based on the time code and the angle code, and outputs it to the display section 24d.

The image processing section 235 implements image processing of the imaging data output by the image receiving section 26, to thereby detect human motion in the predetermined space.

Now the predetermined space refers to a range capturable by the image receiving section 26, among from the space in which the viewer who passes by the display section 24d can recognize the video image displayed by at least the display section 24d. Accordingly, the predetermined space is set in a space in the vicinity of the display section 24d, for example, in the space ahead of it. The predetermined space functions as an instruction spatial coordinate system and an instruction coordinate system in which the viewer directs the angle switching. As illustrated in FIG. 27, in the direction of the x-axis (transverse direction) of the instruction spatial coordinate system, distinct angle codes are assigned to every 20 points, such as AC1 for 0 to 19, AC2 for 20 to 39, AC3 for 40 to 59, AC4 for 60 to 79, AC5 for 80 to 99, AC6 for 100 to 119, AC7 for 120 to 139, AC8 for 140 to 159, and AC9 for 160 to 179. The correlation is stored in the form of correlation table in the storage section 25. The angle codes are switched typically in every 50-cm range in the instruction spatial coordinate system. These angle codes are sequentially assigned rightward on the x-axis of the instruction spatial coordinate system, corresponding to the counterclockwise order of the cameras c1 to c9 arranged in the circumferential direction illustrated in FIG. 2. That is, the shooting point P shown in FIG. 2 and the display center point P1 of the display area on the display screen shown in FIG. 27 are matched, and the angle codes are assigned so that the actual order of arrangement of the cameras c1 to c9 is matched to the order on the coordinate system of the instruction spatial coordinate system. In other words, the angle codes are correlated to the instruction spatial coordinate system so that the angle with respect to the display center point P1 in the instruction spatial coordinate system will agree with the angle of the video image to be displayed. Note that AC1 to AC9 are shown in FIG. 27 merely for the convenience of explanation, and are of course not displayed on the actual instruction spatial coordinate system.

The viewer directs angle switching by moving himself or herself in the instruction spatial coordinate system. In this process, there is no need for the viewer to be conscious to the angle switching instruction, and definitely, operation represented by movement in the instruction spatial coordinate system serves as the angle switching instruction by the viewer. That is, the image processing section 235 detects the continuous shift of the coordinates of the viewer in the instruction spatial coordinate system, as the continuous shift of coordinates of the angle switching instruction.

Next, operations of the thus-configured display device 2d of the fifth embodiment will be explained.

Paragraphs below will explain operations for displaying the time/angle video image data on the display device 2d, referring to FIG. 28.

Suppose now that the display section 24d displays the video image data of the camera c5.

The main control section 231d reads the output of the image receiving section 26 (step S200). Upon receiving the imaging data output from the image receiving section 26, the main control section 231d stores the imaging data into the storage section 25. The main control section 231d further outputs a detection instruction signal to the image processing section 235.

Upon receiving the detection instruction signal output from the main control section 231d, the image processing section 235 reads the imaging data out from the storage section 25, and detects by image processing a position of the viewer in the instruction spatial coordinate system (step S201). For example, the image processing section 235 detects the human motion in the instruction spatial coordinate system, based on changes in the frames preceding and succeeding the imaging data.

The image processing section 235 then determines whether the viewer is in the instruction spatial coordinate system or not (step S202). That is, the image processing section 235 determines whether the viewer is present in the instruction spatial coordinate system, by detecting the human motion making use of image processing. If the viewer is determined to be absent in the instruction spatial coordinate system (step S202: NO), the image processing section 235 outputs a detection keeping signal to the main control section 231d, and the main control section 231d then goes back to step S200 to repeat the processes.

On the other hand, if the viewer is determined to be present in the instruction spatial coordinate system (step S202: YES), the image processing section 235 outputs the coordinate information of the viewer in the instruction spatial coordinate system to the frame control section 232d. Upon receiving the coordinate information, the frame control section 232d reads the time code of the frame which is displayed on the display section 24d when the coordinate information is accepted, and extracts the angle code correlated to the coordinate information from the correlation table stored in the storage section 25. The frame control section 232d also reads the frame corresponded to the time code and the angle code out from the storage section 25, and outputs it to the display section 24d (step S203).

The display section 24d reproduces the frame output from the frame control section 232d, and displays it on the display screen (step S204).

The main control section 231d further reads the output of the image receiving section 26 similarly as in step S200 (step S205). The image processing section 235 then detects, by image processing, a position of the viewer in the instruction spatial coordinate system similarly as in step S201 (step S206).

The image processing section 235 then determines, similarly as in step S202, whether the viewer is present in the instruction spatial coordinate system or not (step S207). If the viewer is determined to be present in the instruction spatial coordinate system (step S207: YES), the image processing section 235 outputs the display signal to the main control section 231d, and thereby the main control section 231d goes back to step S203 to repeat the processes.

On the other hand, if the viewer is determined to be absent in the instruction spatial coordinate system (step S207: NO), the image processing section 235 terminates the processes.

For example, supposed now that, as illustrated in FIG. 27, the viewer passes from the left to right in right front of the display section 24d. When the viewer is coming into a region correlated to angle code AC1 in the instruction spatial coordinate system, the image processing section 235 detects the motion, and the display section 24d displays the frame corresponded to angle code AC1. Since the angle of the video image to be displayed in this process matches the angle with respect to the display center point P1 in the instruction spatial coordinate system, so that when the viewer views the display section 24d from the current point, the video image to be displayed will have angles natural to the viewer.

When the viewer further comes into the region correlated to angle code AC2, the display section 24d displays the frame corresponded to angle code AC2. That is, when the viewer continuously walks over angle codes AC1 to AC9, the display section 24d displays the video image with angles corresponded to the waypoints while successively switching them.

As described above, according to the display device 2d of this embodiment, not only the effects similar to those of the display device 2 in the first embodiment may be obtained, but also the angle of the video image to be displayed may be switched simply by a series of operations such that the viewer continuously moves, irrespective of the viewer's consciousness on the angle switching. Accordingly, it now becomes possible to create interest and attention of the viewer who passed by the display section 24d.

Also since the angle code is correlated to the instruction spatial coordinate system so as to match the angle with respect to the display center point Pi in the instruction spatial coordinate system and the angle of the video image to be displayed, so that it becomes now possible to display the video image with natural angles well matched to the individual waypoints, while successively switching them in synchronization with the movement of the viewer in the instruction spatial coordinate system.

Note that the technical scope of the present invention is not limited to the embodiments described above, and may be modified in various ways, without departing from the spirit of the present invention.

For example, having described that the communication section 14 as an output unit sends the individual data to the server 3, the embodiment is not limited thereto, and may arbitrarily be modified. For example, the data may alternatively be output to an external storage medium such as external hard disk, DVD or USB memory.

Similarly, also the communication section 21 may arbitrarily be modified. For example, the individual data may alternatively be output to an external storage medium such as external hard disk, DVD or USB memory.

Having described that the communication section 14 sends the individual data for the video image, the embodiment is not limited thereto, wherein the video image may be displayed through the control sections 13, 13a, 13b on the display section 16. In this case, the editing devices 1, 1a, 1b serve both as the video image processing device and the video image display device.

The arrangement of the cameras c1 to c9 is not limited to circular, but may arbitrarily be modified. For example, the cameras c1 to c9 may be arranged on a straight line, or on an arbitrary curve. The cameras c1 to c9 may even be arranged in a height-wise direction, vertically or transversely, or back and forth. Angle of setting, positions, and the number of setting of the cameras may arbitrarily be modified.

The video quality, exemplified above as 30 fps, may arbitrarily be modified typically to 10 fps to 120 fps.

While the embodiment above exemplified the cases where the frame rate of the display device 2 is set higher than the frame rate of the time/angle video image data, the relation is not limited thereto, and may arbitrarily be modified. For example, the frame rate of the display device 2 may be set equal to the frame rate of the time/angle video image data, or the frame rate of the display device 2 may be set lower than the frame rate of the time/angle video image data.

Figure 31:
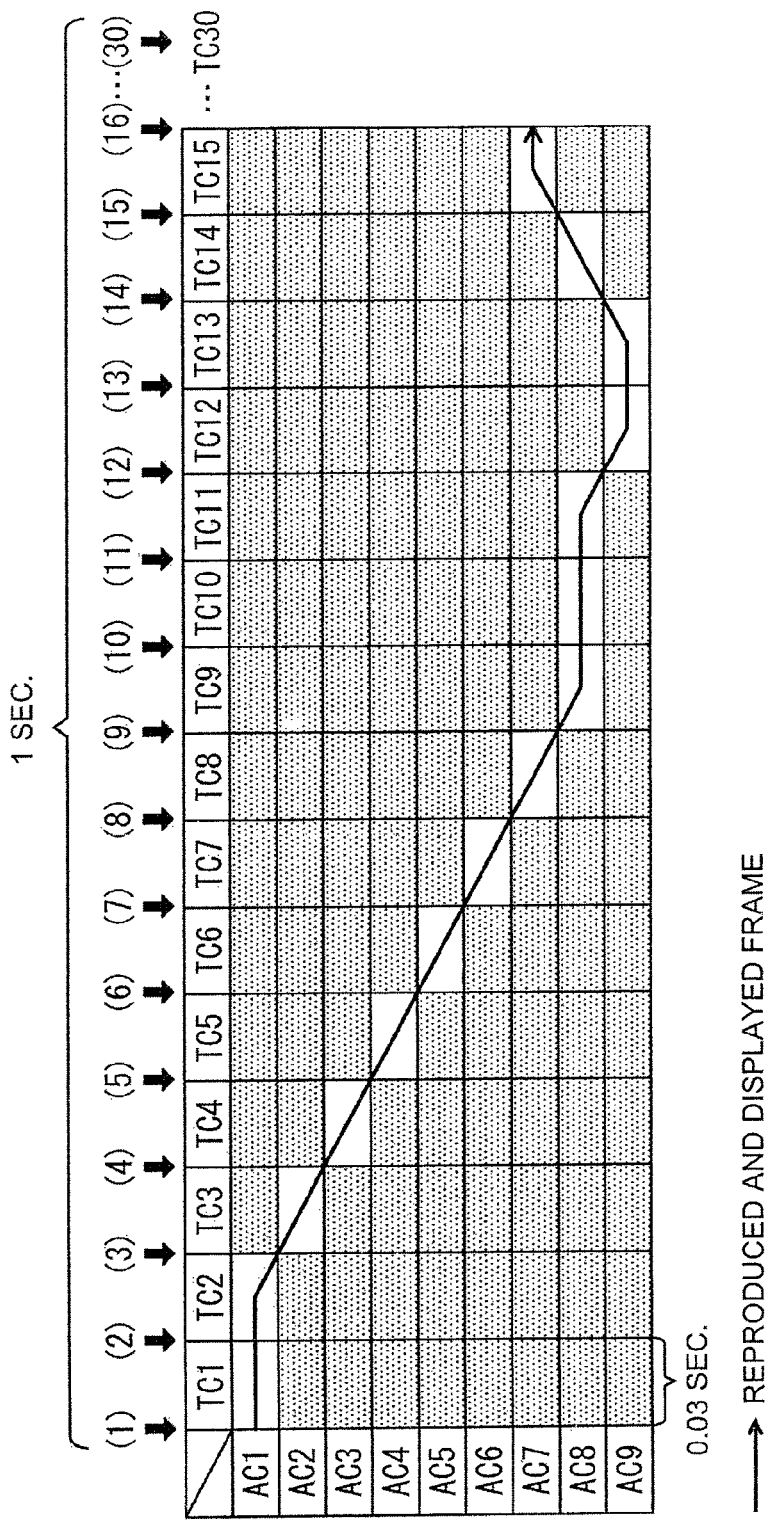
FIG. 31 is an explanatory drawing illustrating a state of frames to be switched in a first modified example of the present invention.

FIG. 31 illustrates an exemplary case where the frame rate of the display device 2 is set equal to the frame rate of the time/angle video image data, corresponding to the first embodiment.

That is, in FIG. 31, the frame rate of the time/angle video image data is set to 30 fps, and the frame rate of the display device 2 is again set to 30 fps, so that the frame-by-frame read cycles (1) to (30) of the time/angle video image data read by the frame control section 232 based on the angle switching instruction received from the operating section 22, agrees with the frame periods (1) to (30) of the time/angle video image data.

In this case, for example, while the display section 24 displays a frame corresponded to the time code TC2 and the angle code AC1, and upon receiving the angle switching instruction typically within the time interval between the thick arrows (2) and (3) (approximately a 0.03-second interval), the angle switching instruction is cached, and the frame control section 232 reads the frame at the time indicated by the thin arrow (3), based on the next time code TC3, and the angle code AC2 directed to be switched. Upon further and successively receiving the angle switching instruction within the time interval between the thin arrows (3) and (4) (approximately a 0.03-second interval), the angle switching instruction is cached in the same way, and the frame control section 232 reads the frame at the time indicated by the thin arrow (4), based on the next time code TC4, and the angle code AC3 directed to be switched. The display section 24 then successively displays the frames.

For the case where, as in this case, the frame rate of the time/angle video image data agrees with the frame rate of the display device 2, one frame of the time/angle video image data agrees with one frame of the display device 2. In other words, the frame-by-frame read cycles (1) to (30) of the time/angle video image data read by the frame control section 232 based on the angle switching instruction received from the operating section 22, agrees with the frame periods (1) to (30) of the time/angle video image data.

Accordingly, upon successive input, through the operating section 22, of the angle switching instruction at the time intervals same as the frame rate of the time/angle video image data, the frame control section 232 reads the frames directed for angle switching at the same intervals in a sequential and successive manner, and the display section 24 displays the thus-read frames at the same time intervals in a sequential and successive manner.

Note that the input of the angle switching instruction by the operating section 22 means only the input read out by the frame control section 232. Accordingly, the time of input of the angle switching instruction by the operating section 22 agrees with the time of reading by the frame control section 232.

Figure 32:
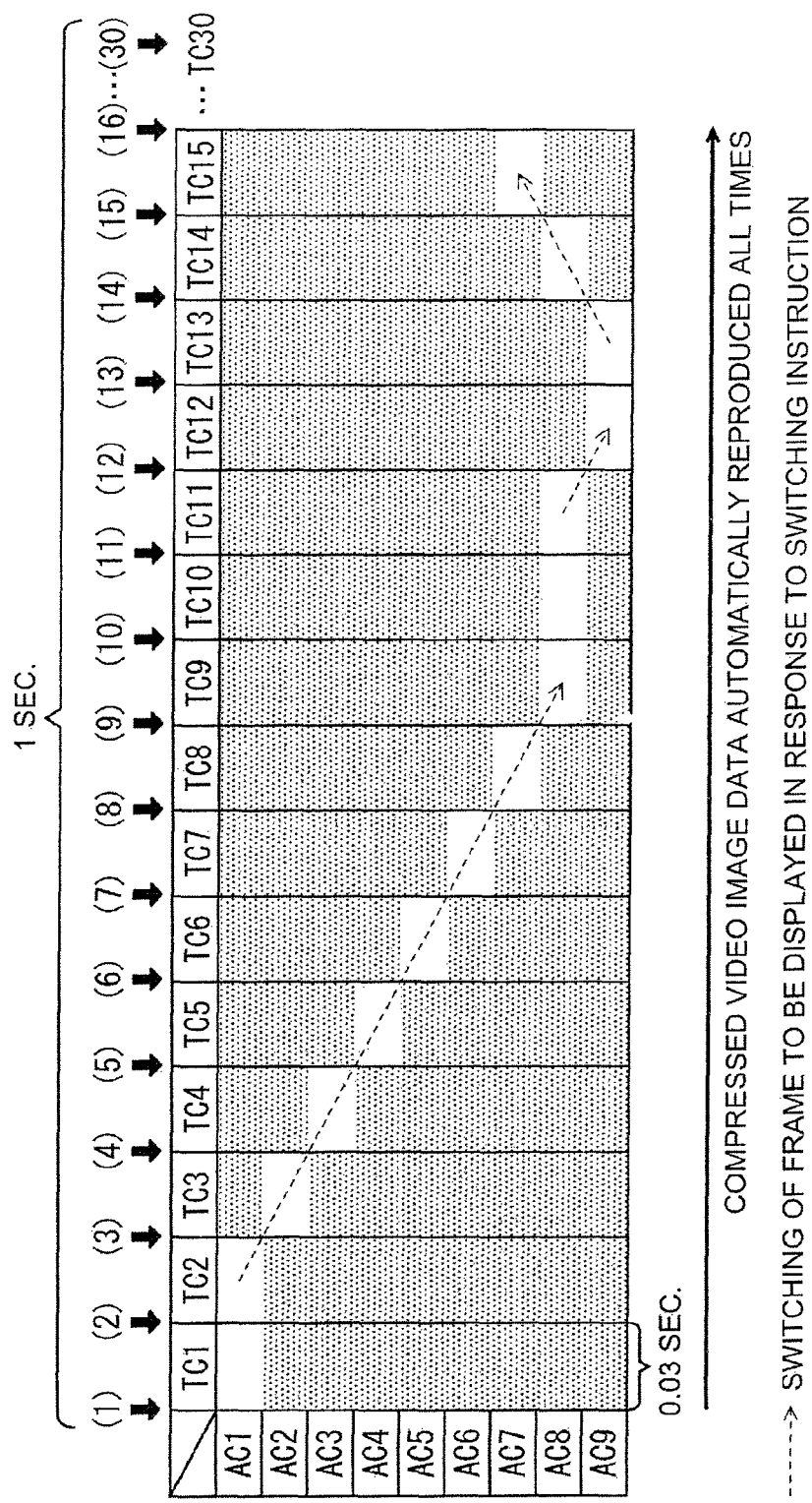
FIG. 32 is an explanatory drawing illustrating a state of frames to be switched in a second modified example of the present invention.

FIG. 32 illustrates an exemplary case where the frame rate of the display device 2 is set equal to the frame rate of the angle-synthesized frame, corresponding to the second embodiment.

That is, in FIG. 32, the frame rate of the angle-synthesized frame is set to 30 fps, and the frame rate of the display device 2 is again set to 30 fps, so that the read cycles (1) to (30) for every angle-synthesized frame read by the synthesized frame control section 232a based on the angle switching instruction received from the operating section 22 agrees with the frame periods (1) to (30) of the angle-synthesized frame.

In this case, for example, while the display section 24a displays a frame corresponded to the time code TC2 and the angle code AC1, and upon receiving the angle switching instruction typically within the time interval between the thick arrows (2) and (3) (approximately a 0.03-second interval), the angle switching instruction is cached, and the synthesized frame control section 232a reads the frame at the time indicated by the thin arrow (3), based on the next time code TC3. The synthesized frame control section 232a then outputs the angle-synthesized frame and the angle code AC2 directed to be switched, and the display section 24a reproduces the synthesized frames correlated to time code TC3, and displays the frame corresponded to angle code AC2. Upon further and successively receiving the angle switching instruction within the time interval between the thin arrows (3) and (4) (approximately a 0.03-second interval), the angle switching instruction is cached in the same way, and the synthesized frame control section 232a reads the angle-synthesized frame at the time indicated by the thin arrow (4), based on the next time code TC4, and outputs the angle-synthesized frame and the angle code AC3 directed to be switched, the display section 24a reproduces the synthesized frames correlated to time code TC4, and displays the frame corresponded to angle code AC3.

As described above, upon successive input, through the operating section 22, of the angle switching instruction at the time intervals same as the frame rate of the angle-synthesized frame, the synthesized frame control section 232a successively reads the next angle-synthesized frames, and successively outputs the angle-synthesized frames and the angle code directed for angle switching. The display section 24a then reproduces these angle-synthesized frames, and displays the frame corresponded to the angle code directed to be switched at the same time intervals in a sequential and successive manner.

Figure 33:
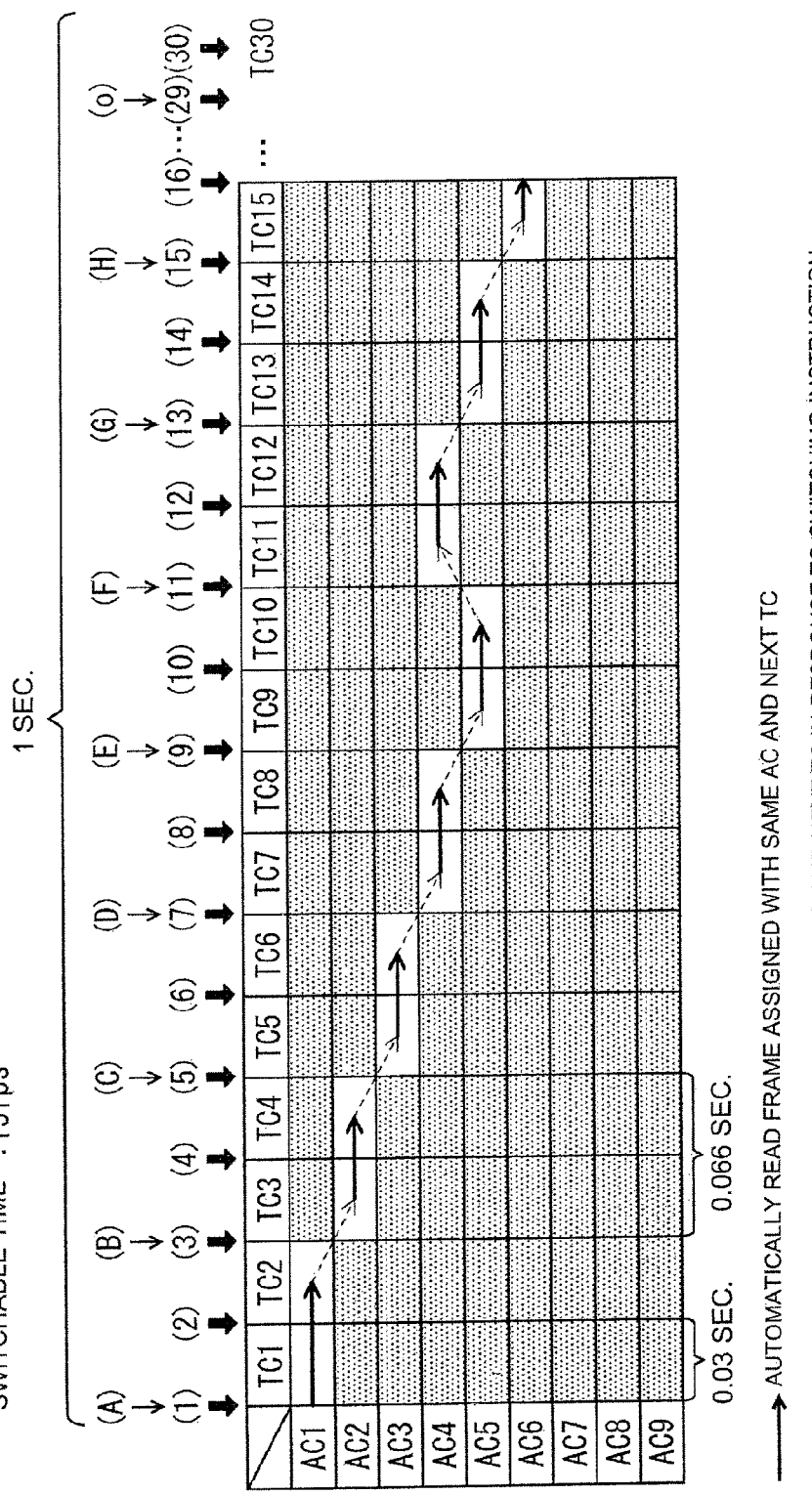
FIG. 33 is an explanatory drawing illustrating a state of frames to be switched in a third modified example of the present invention.

FIG. 33 illustrates an exemplary case where the frame rate of the display device 2 is set equal to the frame rate of the time/angle video image data, corresponding to the first embodiment, whereas the input cycle of the angle switching instruction at the display device 2 is set lower than the frame rate of the time/angle video image data.

That is, in FIG. 33, the frame rate of the time/angle video image data is set to 30 fps, the frame rate of the display device 2 is again set to 30 fps, whereas the input cycle of the angle switching instruction is set to 15 fps. In more details, the frame-by-frame read cycle of the time/angle video image data read by the frame control section 232 and the times (1) to (30) indicated by the thick arrows, and the frame rate of the time/angle video image data are matched. Relative to such time schedule, the time schedule of the angle switching instruction input through the operating section 22 is given by the switching times (A) (B) (C) . . . (O) indicated by the thin arrows, which are set so as to be matched with every second read-out times (1) (3) (5) . . . (29) by the frame control section 232. Note that the "input of the angle switching instruction through the operating section 22" herein means only the inputs read out by the frame control section 232. That is, while the frame control section 232 reads the frame at read-out times (1) to (30) indicated by the thick arrows, the angle switching instruction is read at the switching times (A) (B) (C) . . . (O) indicated by the thin arrows. Accordingly, the angle switching instruction is now input through the operating section 22 at a cycle of switching times (A) (B) (C) . . . (O).

In this case, for example, while the display section 24 displays the frame corresponded to the time code TC1 and angle code AC1, upon receiving the angle switching instruction within the time interval between the thin arrows (A) and (B) (approximately a 0.066-second interval), the angle switching instruction is cached, and the frame control section 232 reads the frame corresponded to the next time code TC2 and the same angle code AC1 at the time indicated by the thick arrow (2). The frame control section 232 further reads the frames, based on the next time code TC3 and the angle code AC2 directed to be switched, at the time indicated by the thick arrow (3). Successively thereto, upon receiving the angle switching instruction within the time interval between the thin arrows (B) and (C) (approximately a 0.066-second interval), the angle switching instruction is cached in the same way, and the frame control section 232 reads, at the time of the thin arrow (4), the frame corresponded to the next time code TC4 and the same angle code AC2, and successively reads, at the time of the thin arrow (5), the frame based on the next time code TC5 and the angle code AC3 directed to be switched. In this way, the display section 24 successively displays the frames.

As described above, upon successive input of the angle switching instruction by the operating section 22, at time intervals longer than the frame rate of the time/angle video image data, the frame control section 232 reads the frame according to the frame rate of the time/angle video image data, and further reads the frame directed for angle switching at the above-described long time intervals in a sequential and successive manner. The display section 24 displays the frames according to the frame rate of the time/angle video image data, and displays the frames directed for switching at the above-described long time intervals in a sequential and successive manner.

FIG. 34 illustrates an exemplary case where the frame rate of the display device 2 is set equal to the frame rate of the angle-synthesized frame, corresponding to the second embodiment, whereas the input cycle of the angle switching instruction at the display device 2 is set lower than the frame rate of the angle-synthesized frame.

That is, in FIG. 34, the frame rate of the angle-synthesized frame is set to 30 fps, the frame rate of the display device 2 is again set to 30 fps, and the input cycle of the angle switching instruction is set to 15 fps. In more details, the frame-by-frame read cycle of the synthesized frame read by the synthesized frame control section 232a and the times (1) to (30) indicated by the thick arrows, agrees with the frame rate of the angle-synthesized frame. Relative to such time, the time of the angle switching instruction input through the time operating section 22 is given by the switching times (A)(B)(C) . . . (O) indicated by the thin arrows, which are set so as to be matched with every second read-out times (1)(3) (5)-(29) by the synthesized frame control section 232a. Note that the "input of the angle switching instruction through the operating section 22" herein means, of course, same as described above.

In this case, for example, while the display section 24a displays the frame corresponded to the time code TC1 and angle code AC1, upon receiving the angle switching instruction within the time interval between the thin arrows (A) and (B) (approximately a 0.066-second interval), the angle switching instruction is cached, and the synthesized frame control section 232a reads, at the time of the thick arrow (2), the angle-synthesized frame based on the next time code TC2. The display section 24a reproduces the synthesized frames correlated to time code TC2, and displays the frame corresponded to the same angle code AC1. The synthesized frame control section 232a then reads, at the time of the thin arrow (3), the angle-synthesized frames based on the next time code TC3. The synthesized frame control section 232a then outputs the angle-synthesized frames and the angle code AC2 directed to be switched, the display section 24a reproduces the synthesized frames correlated to time code TC3, and displays the frame corresponded to angle code AC2. Successively thereto, upon successive input of the angle switching instruction within the time interval between the thin arrows (B) and (C) (approximately a 0.03-second interval), the angle switching instruction is cached in the same way, and the synthesized frame control section 232a reads, at the time of the thick arrow (4), the angle-synthesized frame based on the next time code TC3. The display section 24a reproduces the synthesized frames correlated to time code TC3, and displays the frame corresponded to the same angle code AC2. The synthesized frame control section 232a further reads, at the time of the thick arrow (5), the angle-synthesized frames based on the next time code TC5, outputs the angle-synthesized frames and the angle code AC3 directed to be switched, the display section 24a reproduces the synthesized frames correlated to time code TC5, and displays the frame corresponded to angle code AC3.

As described above, upon successive input, through the operating section 22, of the angle switching instruction at intervals longer than the frame rate of the angle-synthesized frame, the synthesized frame control section 232a reads the angle-synthesized frame according to the frame rate of the angle-synthesized frame, and outputs the angle-synthesized frames. The display section 24 reproduces the angle-synthesized frames according to the frame rate of the angle-synthesized frames, and displays the frames. The synthesized frame control section 232a further successively outputs the next angle-synthesized frames and the angle code directed to be switched. The display section 24a then reproduces the angle-synthesized frames, and displays the frame corresponded to the angle code directed to be switched, at the above-described long time intervals in a sequential and successive manner.

Having described that the display begins with angle code AC1, the angle code for the first display may arbitrarily be modified, for example, to angle code AC5 in the right front of the object, or to the rightmost angle code AC9.

Having described that the time code is defined as the time information, and the angle code is defined as the angle information, the time information and the angle information may arbitrarily be modified.

Having described that the size matching process, the tilt matching process, the center point matching process and the time matching process are implemented, alternatively without being limited thereto, at least either one of these matching process may be implemented.

Having described that the operating sections 12, 22 are exemplified by mouse and so forth, alternatively without being limited thereto, they may arbitrarily be modified. For example, the angle switching may be directed by shifting a contact point of a finger on a display screen such as touch panel, rather than displaying the angle switching instruction. In this case, the contact point in the instruction display coordinate system functions as the coordinates for the angle switching instruction.

Having described in Embodiment 5 that the instruction input unit is configured to detect the viewer's motion by image processing, alternatively without being limited thereto, it may arbitrarily be modified. For example, the viewer's motion may be detected using an infrared detection unit which detects the viewer's motion making use of infrared radiation emitted from the viewer, or a position detecting unit making use of the GPS function of a viewer's mobile terminal. Still alternatively, the instruction input unit may be a tilt detection unit or an angle detection unit, so that the angle of video image may successively be switched, upon changed in the tilt or angle of the display section 24d by the viewer, according to such changes.

For example, the tilt detection unit or the angle detection unit may be provided to a mobile terminal such as smartphone. A possible configuration is that, upon continuous changes in the angle of the mobile terminal, while the user holding the mobile terminal and viewing the display section, the tilt detection unit or the angle detection unit successively inputs the angle switching instruction, and thereby the display section displays the video while successively switching the angle as illustrated in FIG. 11. Accordingly, the angle of video displayed on the display section may successively be switched, only if the mobile phone held by the user changes in the angle.

The tilt detection unit or the angle detection unit as the instruction input unit may alternatively be provided to a goggle-type device capable of displaying video on a portion of spectacles which covers the eyes (glass or lens portion). That is, a possible configuration is that, upon changes in the angle of face of the user while wearing the goggle-type device, the tilt detection unit or the angle detection unit successively inputs the angle switching instruction, and thereby the portion which covers the eyes, as the display section, displays the video while successively switching the angle as illustrated in FIG. 11. Accordingly, the angle of video viewed by the user on the display section may successively be switched, only if the user who wears the goggle-type device changes the angle of its face.

Having described that the image processing section 235 detects the motion of the whole body of the viewer, alternatively without being limited thereto, it may arbitrarily be modified. For example, it may be configured to detect motion of at least a part of the viewer's body. More specifically, a possible configuration is that the motion of the viewer's hand slid from the left to right in the instruction spatial coordinate system is detected as the angle switching instruction. Since the angle of video image in this configuration may successively be changed in accordance with motion of the hand or other part of the body, so that the viewer can direct the angle switching in a real time manner, typically by moving the hand while viewing changes in the angle of the video image.

The display sections 24, 24a, 24b, 24c, 24d may be configured not only by monitors such as liquid crystal display, plasma display and organic EL display, but also may be stereoscopic display based on hologram.

Having described that the image processing section 235 is configured to detect shift of the viewer, it may arbitrarily be modified without being limited thereto. For example, not only human, but also an animal such as dog or cat may be used.

Of course, Embodiments 1 to 5 and the modified examples described above may arbitrarily be combined.

Video image may be processed and displayed, alternatively by storing a program, designed to implement the functions of the control sections 13, 13a, 13b, and control sections 23, 23a, 23b, 23c, 23d, in a computer-readable recording medium, loading the program recorded in the recording medium on a computer system, and by executing the program. Note that the "computer system" herein includes OS and hardware such as peripheral devices.

The "computer system", if supporting the www system, is understood to include an environment for providing (or displaying) web sites.

The "computer-readable recording medium" herein refers to portable media such as flexible disk, opto-magnetic disk, ROM, CD-ROM, DVD and so forth; and storage devices such as hard disk incorporated in the computer system. The "computer-readable recording medium" also includes components which dynamically hold the program over a short period, such as communication line used when the program is sent through a communication circuit which includes a network such as the Internet, or communication line such as a telephone line; and components which hold the program over a predetermined period, such as volatile memory inside the computer system which acts as a server or a client. The program may be configured to implement a part of the above-described functions, or may be configured to implement the above-described functions, as combined with a program preliminarily recorded in the computer system.

EXPLANATION OF REFERENCES 1,1a,1b editing device (video image processing device)
2,2a,2b,2c,2d display device (video image display device)
10,10a,10b,10c video image processing/display system
11 input section (input unit)
14 communication section (output unit)
22 operating section (instruction input unit, shift unit)
24,24a,24b,24c,24d display section (display unit)
26 image receiving section (instruction input unit)
132 matching process section (size matching unit, tilt matching unit, center point matching unit, time matching unit)
133 video image data generating section (time/angle video image data generating unit)
134 angle-synthesized frame generating section (angle-synthesized frame generating unit)
135 compression calculating section (compression unit)
232,232c,232d frame control section (read-out unit)
232a synthesized frame control section (read-out unit)
232b frame control section (read-out unit, shift information calculating unit)
234 blur calculation section (blurring unit)
235 image processing section (detection unit)

The invention claimed is:

1. A video image display apparatus which displays video images of an object shot from multiple angles by a plurality of cameras, the video image display apparatus comprising:
  a processor, a memory, and a display unit, wherein the memory contains instructions for causing the processor to perform operations of:
  reading out, among from time/angle video image data in which time identification information which indicates a position on a time axis of the video image, and angle identification information which indicates a position for each angle are correlated frame by frame, frames corresponded to the time identification information and the angle identification information in a frame-by-frame manner in a time order of the time identification information;
  causing the display unit to display the frames read out, in the frame-by-frame manner in the time order of the time identification information;
  in a state where an instruction coordinate system for directing angle switching of the video image is correlated with the angle identification information, and in a state where the display unit displays a frame corresponded to a predetermined time identification information and angle identification information, upon continuous shift of coordinates of an angle switching instruction for the video image across the angle identification information adjacent to the angle identification information in the instruction coordinate system at a short time interval shorter than a frame rate of the video image, successively inputting the angle switching instruction at the short time interval by successively detecting the shift;

upon successive input of the angle switching instruction at the short time interval, successively reading out at the short time interval a frame corresponded to the time identification information at a time of input of the angle switching instruction which is input at the coordinates corresponded to the adjacent angle identification information, and to the adjacent angle identification information, and a frame corresponded to the time identification information at the time of input of the angle switching instruction which is input across the adjacent angle identification information and to the angle identification information beyond the adjacent angle identification information; and causing the display unit to display the frames read out, as successively switched from the frame being displayed at the short time interval.

2. The video image display apparatus of claim 1, wherein the instruction coordinate system is an instruction spatial coordinate system set in a vicinity of the display unit, and the operations further comprise:

detecting continuous shift of the coordinates of a viewer who views the video image in the instruction spatial coordinate system, successively reading out the frames which correspond to the angle identification information corresponded to the coordinates of the viewer at a time when the shift is detected, and to the time identification information at a time when the shift is done, and causing the display unit to display the frames read out while successively switching the frames.

3. The video image display apparatus of claim 2, wherein the angle identification information is correlated to the instruction spatial coordinate system, so that the angle with respect to the display unit in the instruction spatial coordinate system matches the angle of the video image to be displayed.

4. The video image display apparatus of claim 1, wherein the instruction coordinate system is an instruction display coordinate system on a display screen of the display unit, and the operations further comprise:

successively inputting the angle switching instruction by continuously shifting the coordinates of the angle switching instruction on the display screen, successively reading out the frames which correspond to the angle identification information corresponded to the coordinates of the angle switching instruction at a time of shifting, and to the time identification information at the time of shifting, and causing the display unit to display the frames read out while successively switching the frames.

5. The video image display apparatus of claim 4, wherein the angle identification information is correlated to the instruction display coordinate system, so that the angle on the display screen in the instruction display coordinate system matches the angle of the video image to be displayed.

6. The video image display apparatus of claim 1, wherein the operations further comprise:

blurring the frame depending on a size of shift of the angle switching instruction and a length of time of shifting, reading out the blurred frame, and causing the display unit to display the blurred frame read out.

7. The video image display apparatus of claim 1, wherein the time/angle video image data is formed independently frame by frame, based on the time identification information and the angle identification information, and the operations further comprise:

reading out the frames independently frame by frame, and causing the display unit to reproduce and to display the frames read out independently frame by frame.

8. The video image display apparatus of claim 1, wherein the time/angle video image data is formed as an angle-synthesized frame obtained by synthesizing the individual frames correlated with the same time identification information, and with different angle identification information, and the operations further comprise:

reading out the angle-synthesized frame independently for each of the angle-synthesized frames, and causing the display unit to reproduce the angle-synthesized frames read out, independently for each of the angle-synthesized frames, and to display, among from the reproduced angle-synthesized frames, only the frame corresponded to the angle identification information when the angle switching instruction is input.

9. A video image display method which displays video images of an object shot from multiple angles by a plurality of cameras, the method comprising:

a step of reading out, in which a read-out unit reads, among from time/angle video image data in which time identification information which indicates a position on a time axis of the video image, and angle identification information which indicates a position for each angle are correlated frame by frame, frames corresponded to the time identification information and the angle identification information in a frame-by-frame manner in a time order of the time identification information;

a step of displaying, in which a display unit displays the frames read out, in the frame-by-frame manner in the time order of the time identification information;

a step of inputting an angle switching instruction, in which, in a state where an instruction coordinate system for directing angle switching of the video image is correlated with the angle identification information, while a frame corresponded to a predetermined time identification information and angle identification information is displayed, and, upon continuous shift of coordinates of the angle switching instruction across the angle identification information adjacent to the angle identification information in the instruction coordinate system at a short time interval shorter than a frame rate of the video image, an instruction input unit, which is configured to input the angle switching instruction for the video image by detecting shift of coordinates of the angle switching instruction in the instruction coordinate system, successively inputs the angle switching instruction for the video image at the short time interval by successively detecting the shift of coordinates of the angle switching instruction in the instruction coordinate system;

a step of reading out for switching, in which, upon successive input of the angle switching instruction at the short time interval, the read-out unit successively reads out at the short time interval a frame corresponded to the time identification information at a time of input of the angle switching instruction which is input at the coordinates corresponded to the adjacent angle identification information, and to the adjacent angle identification information, and a frame corresponded to the time identification information at the time of input of the angle switching instruction which is input across the adjacent angle identification information and to the angle identification information beyond the adjacent angle identification information; and a step of displaying in the display unit the frames read out, as successively switched from the frame being displayed at the short time interval.

10. A non-transitory computer readable medium for a video image display apparatus which displays video images of an object shot from multiple angles by a plurality of cameras, the non-transitory computer readable medium being configured to make a computer of the video image display apparatus execute:

a step of reading out, in which a read-out unit reads, among from time/angle video image data in which time identification information which indicates a position on a time axis of the video image, and angle identification information which indicates a position for each angle are correlated frame by frame, frames corresponded to the time identification information and the angle identification information in a frame-by-frame manner in a time order of the time identification information;

a step of displaying, in which a display unit displays the frames read out, in the frame-by-frame manner in the time order of the time identification information;

a step of inputting an angle switching instruction, in which, in a state where an instruction coordinate system for directing angle switching of the video image is correlated with the angle identification information, while a frame corresponded to a predetermined time identification information and angle identification information is displayed, and, upon continuous shift of coordinates of the angle switching instruction across the angle identification information adjacent to the angle identification information in the instruction coordinate system at a short time interval shorter than a frame rate of the video image, an instruction input unit, which is configured to input the angle switching instruction for the video image by detecting shift of coordinates of the angle switching instruction in the instruction coordinate system, successively inputs the angle switching instruction for the video image at the short time interval by successively detecting the shift of coordinates of the angle switching instruction in the instruction coordinate system;

a step of reading out for switching, in which, upon successive input of the angle switching instruction at the short time interval, the read-out unit successively reads out at the short time interval a frame corresponded to the time identification information at a time of input of the angle switching instruction which is input at the coordinates corresponded to the adjacent angle identification information, and to the adjacent angle identification information, and a frame corresponded to the time identification information at the time of input of the angle switching instruction which is input across the adjacent angle identification information and to the angle identification information beyond the adjacent angle identification information; and a step of displaying in the display unit the frames read out, as successively switched from the frame being displayed at the short time interval.

11. A video image processing/display system comprising:

a video image processing apparatus, which processes video images of an object shot from multiple angles by a plurality of cameras, and a video image display apparatus which displays the video image processed by the video image processing apparatus, connected to the video image processing apparatus;

wherein the video image processing apparatus comprises:

a processor and a memory wherein the memory contains instructions for causing the processor to perform operations of:

generating time/angle video image data, by correlating frame-by-frame the video image input from the plurality of cameras with time identification information which indicates a position on a time axis of the video image, and with angle identification information which indicates a position for each angle; and outputting the time/angle video image data generated to the video image display apparatus, and, the video image display apparatus comprises:

a processor, a memory, and a display unit wherein the memory contains instructions for causing the processor to perform operations of:

reading out, among from the time/angle video image data output from the video image processing apparatus, frames corresponded to the time identification information and the angle identification information in a frame-by-frame manner in a time order of the time identification information;

causing the display unit to display the frames read out, in the frame-by-frame manner in the time order of the time identification information; and in a state where an instruction coordinate system for directing angle switching of the video image is correlated with the angle identification information, and in a state where the display unit displays a frame corresponded to a predetermined time identification information and angle identification information, upon continuous shift of coordinates of an angle switching instruction for the video image across the angle identification information adjacent to the angle identification information in the instruction coordinate system at a short time interval shorter than a frame rate of the video image, successively inputting the angle switching instruction at the short time interval by successively detecting the shift;

upon successive input of the angle switching instruction at the short time interval, successively reading out at the short time interval a frame corresponded to the time identification information at a time of input of the angle switching instruction which is input at the coordinates corresponded to the adjacent angle identification information and to the adjacent angle identification information, and a frame corresponded to the time identification information at the time of input of the angle switching instruction which is input across the adjacent angle identification information and to the angle identification information beyond the adjacent angle identification information, and causing the display unit to display the frames read out, as successively switched from the frame being displayed at the short time interval.

12. The video image display apparatus of claim 2, further comprising an image receiving section attached to the display unit for detecting continuous shift of the coordinates in a predetermined space in the vicinity of the display unit.

13. The video image display apparatus of claim 8, wherein the angle-synthesized frame is synthesized so that the individual frames correlated with the same time identification information and different angle identification information are synthesized in a matrix.

* * * * *